(12) United States Patent
Khan

(10) Patent No.: US 10,320,807 B2
(45) Date of Patent: Jun. 11, 2019

(54) SYSTEMS AND METHODS RELATING TO THE AUTHENTICITY AND VERIFICATION OF PHOTOGRAPHIC IDENTITY DOCUMENTS

(71) Applicant: Sal Khan, Ottawa (CA)

(72) Inventor: Sal Khan, Ottawa (CA)

( * ) Notice: Subject to any disclaimer, the term of this patent is extended or adjusted under 35 U.S.C. 154(b) by 94 days.

(21) Appl. No.: 14/630,728

(22) Filed: Feb. 25, 2015

(65) Prior Publication Data

US 2015/0341370 A1    Nov. 26, 2015

Related U.S. Application Data

(60) Provisional application No. 61/944,191, filed on Feb. 25, 2014.

(51) Int. Cl.
*G06F 7/04* (2006.01)
*H04L 29/06* (2006.01)

(52) U.S. Cl.
CPC ............ *H04L 63/123* (2013.01); *H04L 63/08* (2013.01); *H04L 63/0861* (2013.01); *H04L 63/12* (2013.01); *H04L 63/126* (2013.01); *H04L 63/20* (2013.01)

(58) Field of Classification Search
CPC ... H04L 63/123; H04L 63/0428; H04L 63/08; G06F 21/10; G06F 21/6218; G11B 20/00086
USPC .......................................................... 726/30
See application file for complete search history.

(56) References Cited

U.S. PATENT DOCUMENTS

| | | | | |
|---|---|---|---|---|
| 5,337,358 A | * | 8/1994 | Axelrod | G06Q 20/3821 235/379 |
| 6,341,169 B1 | * | 1/2002 | Cadorette, Jr. | G06Q 20/04 340/5.8 |
| 6,532,541 B1 | * | 3/2003 | Chang | G06T 1/0028 380/216 |
| 2005/0067487 A1 | * | 3/2005 | Brundage | G06K 19/16 235/380 |
| 2009/0052751 A1 | * | 2/2009 | Chaney | G06K 9/6202 382/120 |
| 2009/0154778 A1 | * | 6/2009 | Lei | G06K 9/00456 382/112 |
| 2010/0158326 A1 | * | 6/2010 | Takeda | G06K 9/00154 382/119 |
| 2013/0112746 A1 | * | 5/2013 | Krell | G06K 5/00 235/380 |

* cited by examiner

*Primary Examiner* — Ali Abyaneh

(57) ABSTRACT

Identity documents are produced to confirm the identity of an individual and often their rights, such as driver's license, health card, age, and residence. False and counterfeit documents however can be used to commit fraud, gain unauthorized access to services and steal an individual's identity. Embodiments of the invention address verification and authentication of an identity document by correlating the information extracted from the identity document at the time of its presentation as evidence of an individual's identity with the original data relating to the identity document when it was issued to an individual or subsequently verified by an issuing authority of the identity document.

18 Claims, 10 Drawing Sheets

SYSTEMS AND METHODS RELATING TO THE AUTHENTICITY AND VERIFICATION OF PHOTOGRAPHIC IDENTITY DOCUMENTS

CROSS-REFERENCE TO RELATED APPLICATIONS

This patent application claims the benefit of U.S. Provisional Patent Application 61/944,191 filed Feb. 25, 2014 entitled "System and Method that Verifies the Authenticity and Attributes of a Photo Identity Document and the Identity of Its Bearer", the entire contents of which are incorporated herein by reference.

FIELD OF THE INVENTION

This invention relates to identity verification and more particularly to methods and systems for authenticating and verifying users based upon verified credentials.

BACKGROUND OF THE INVENTION

Identity documents are produced to confirm the identity of an individual and often their rights, such as driver's license, health card, age, and residence. False and counterfeit documents however can be used to commit fraud, gain unauthorized access to services and steal an individual's identity. It would be beneficial to authenticate identity documents in order to stop fraud, protect individual's identity and meet compliance obligations.

Counterfeit identity documents can be difficult to distinguish from authentic identify documents. Yet the inability to properly do so can result in:
- Loss of life (e.g., unsafe drivers driving while suspended);
- ID-related fraud (e.g., credit card fraud, ID theft, passing bad checks, illegal purchase of alcohol);
- Fraudulently obtained entitlement to services or jobs (e.g. welfare fraud); and
- Other criminal activity leading to economic and social losses.

Over time there has been an increase in counterfeiting and alterations to identity, travel and other documents, such as driver's licenses, passports, identification cards, and passes. In addition, there has been an increase in counterfeiting and alterations to documents having value, such as negotiable instruments, bonds and other similar documents. This has caused concern to Governments and companies who issue such identity and travel documents, and much financial loss where such counterfeit and altered documents are documents of value.

Whilst the security for identity (ID) documents, such as ID cards has improved significantly in the past decade or so to include a number of security features, such as 2D bar code and MRZ codes that include encoded attributes on the back of the card, holographs and other images only seen with ultraviolet and infrared light on the front and back of the ID card. Standalone tests allow the attributes to be matched on the front of the ID document to attributes on the 2D bar code and the MRZ code. Prior art systems aim to reduce identity fraud by determining if attribute information on the front side of identity documents such as photographic ID cards and match it to user attribute information found on magnetic stripes and barcodes on the ID document. However, such solutions do not prevent fraud, identity theft, etc. through replication of a stolen card, replacement of photographs, falsification of dates of birth etc.

Accordingly, it would be beneficial to provide retailers and others seeking to verify the identity of a bearer of an identity card and/or authenticity of a document with a system and/or means allowing the presented credential to be verified against the data held by the issuing authority.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to identity verification and more particularly to methods and systems for authenticating and verifying users based upon verified credentials.

In accordance with an embodiment of the invention there is provided a method method for validating an identity document comprising:
scanning the identity document with an imaging device to produce at least one scanned image;
locating a document identifier on the identity document using the imaging device;
locating, using an verification server, the identity number in a jurisdiction identity database maintained by an authority who issued the identity document;
determining with the verification server if all or a portion of the scanned image of the identity document as a whole, and its component parts match a corresponding synthesized digital image of the identity document and component parts of the identity document in a jurisdiction identity information database; and
outputting to a display an indication of whether or not the identity document is valid based on the determination.

In accordance with an embodiment of the invention there is provided a system for validating an identity document, the system comprising a terminal for scanning the identity document and an identity verification server for determining if a scanned image of a portion of the identity document matches a corresponding image in a jurisdiction identity database storing images used to produce a valid identity document.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
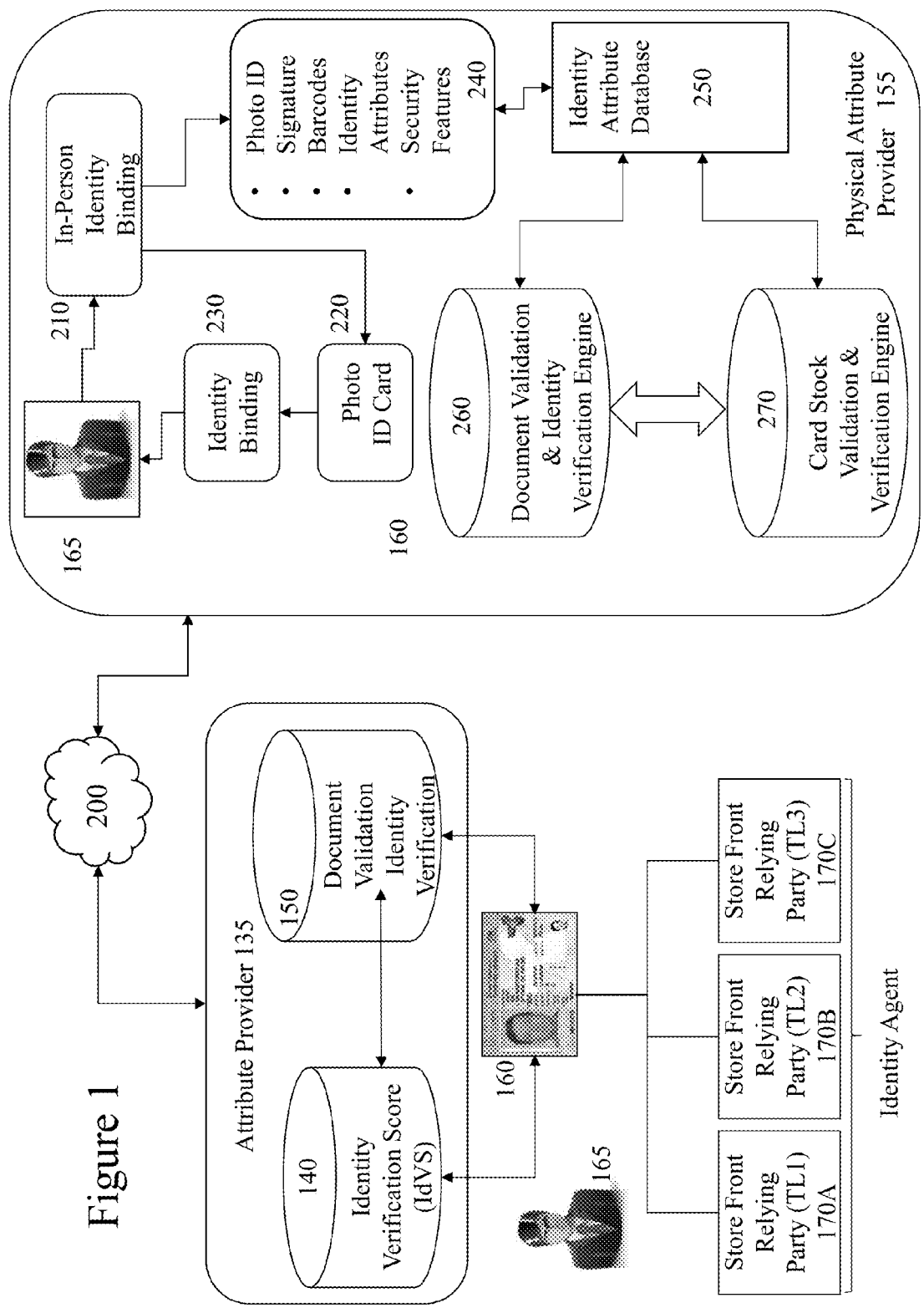
FIG. 1 depicts a real world and virtual world identity ecosystem according to an embodiment of the invention.

The present invention is directed to identity verification and more particularly to methods and systems for authenticating and verifying users based upon verified credentials.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and for wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wilds, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life®).

An "enterprise" as used herein may refer to, but is not limited to, a provider of a service and/or a product to a user, customer, client, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" or "credential holder" as used herein refers to an individual who, either locally or remotely, by their engagement with a service provider, third party provider, enterprise, social network, social media etc. via a dashboard, web service, website, software plug-in, software application, or graphical user interface provides an electronic credential as part of their authentication with the service provider, third party provider, enterprise, social network, social media etc. This includes, but is not limited to, private individuals, employees of organizations and/or enterprises, members of community organizations, members of charity organizations, men, women, children, and teenagers. "User information" as used herein may refer to, but is not limited to, user identification information, user profile information, and user knowledge.

A "security credential" (also referred to as a credential) as used herein may refer to, but is not limited to, a piece of evidence that a communicating party possesses that can be used to create or obtain a security token. This includes, but is not limited to, a machine-readable cryptographic key, a machine-readable password, a cryptographic credential issued by a trusted third party, or another item of electronic content having an unambiguous association with a specific, real individual. Such security credentials may include those that are permanent, designed to expire after a certain period, designed to expire after a predetermined condition is met, or designed to expire after a single use.

A "government issued photographic identity document" as used herein may refer to, but is not limited to, any document, card, or electronic content item issued by a government body for the purposes of identifying the owner of the government issued photographic identity document. Such government bodies may, for example, be provincial, federal, state, national, and regional governments alone or in combination. Such government issued photographic identity documents, also referred to within this specification as Card credentials, government issued photographic cards, and government issued identity documents may include, but are not limited to, a driver's license, a passport, a health card, national identity card, and an immigration card although they have the common feature of a photographic image, multimedia image, or audiovisual image of the user to whom the government issued photographic identity document was issued. Such government issued photographic identity documents may include, but not be limited to, those comprising single sided plastic card, double sided plastic cards, single sided sheets, double side sheets, predetermined sheets within a book or booklet, and digital representations thereof in isolation or in combination with additional electronic/digital data that has been encoded/encrypted. For example, a digital memory with fingerprint scanner in the form of what is known as a "memory stick" may be securely issued by a government body as the fingerprint data for the user is securely encoded and uploaded together with image and digital content data. Subsequently, the digital memory when connected to a terminal and activated by the user's fingerprint may transfer the required digital data to the terminal to allow for a verification that the user is the one and the same. Such memory devices can be provided which destroy or corrupt the data stored within upon detection of tampering.

A "card credential" as used herein may refer to, but Is not limited to, any document, card, or other physical item or element issued and associated with a user, the card being generated/issued for the purposes of identifying the user of the card credential, authorizing an action to be performed on behalf of the user of the card, or allowing the user to perform an action. Such card credentials may be issued by government bodies which may, for example, be provincial, federal, state, national, and regional governments alone or in combination. Such card credentials may be issued by financial institutions, banks, credit providers, employers, libraries, museums, security agencies, and healthcare providers for example. Such card credentials may include, but not be limited to, those comprising single sided plastic card, double sided plastic cards, single sided sheets, double side sheets, cards with integrated electronic circuits, cards with embedded display elements, cards with magnetic stripes, cards with wireless transponders, cards with radio frequency identification devices (RFID), and cards with integrated memory. For example, a card credential with integrated electronics, pressure activation, and digital display may generate a code for use as part of a transaction alone or in combination with other security credential(s) of the user.

"Encryption" as used herein may refer to, but are not limited to, the processes of encoding messages or information in such a way that only authorized parties can read it. This includes, but is not limited to, symmetric key encryption through algorithms such as Twofish, Serpent, AES (Rijndacl), Blowfish, CAST5, RC4, 3DES, and IDEA for example, and public-key encryption through algorithms such as Diffie-Hellman, Digital Signature Standard, Digital Signature Algorithm, ElGamal, elliptic-curve techniques, password-authenticated key agreement techniques, Paillier cryptosystem, RSA encryption algorithm, Cramer-Shoup cryptosystem, and YAK authenticated key agreement protocol.

Referring to FIG. 1 there is depicted a card credential verification and authentication service (CCVAS) according to an embodiment of the invention. As depicted in FIG. 1 this CCVAS comprises a physical attribute provider (PHYSAP) 155 in communication with an attribute provider 135. The PHYSAP 155 represents a card credential issuer wherein the card credential may or may not include a photograph of the user 165 to whom it relates. Accordingly, the PHYSAP 155 is an issuing authority authorised to issue card credentials either for their own enterprise/activity or on behalf of others. Within the descriptions described below in respect of FIGS. 1 to 10 the system and information flows are described with respect to a credential holder being identity-proofed in person. However, it would be evident that within other embodiments of the invention a PHYSAP 155 may authenticate the user 165 by an identity proofing and subsequently issue the user 165 with the card credential 160 either as an initial provisioning or through a re-issue/updating. In other embodiments of the invention the card credential 160 may require authorization to be provided prior to the card credential 160 being valid, e.g. via a telephone made by the user 165 from a telephone number associated with the card credential 160 by the PHYSAP 155. Other embodiments and variations would be evident to one skilled in the art.

Accordingly, a credential holder (user 165) may be identity-proofed in-person by a trusted agent of the PHYSAP 155. This process step 210 results in the issuance of card credential 160 (step 220) And the credential holder's proofed identity being bound (step 230) to the card credential. As a result of this sequence the credential holder's identity-proofed attributes being stored in step 240 within an Identity Attribute Database 250 managed by the document issuer. Attributes stored in respect of the credential holder within the Identity Attribute Database 250 may include, but not be limited to, the photograph of the user 165, the signature of the user 165, the user's name and address, type of document, financial account information, date of expiry, bank identification number, CVV2, CVC2, CVV1, CVC1, issuer identity, and date of issue. The information within the Identity Attribute Database 250 is also accessible by a Document Validation and Identity Verification Engine (DVIVE) 260 which is in communication with an Attribute Provider 135 via network 200. The DYNE 260 may also is in communication with a Card Stock Validation and Verification Engine (CSVVE, not shown for clarity) which is in communication with a Card Stock Provider (also not shown for clarity) such that the DVIVE 260 may extract data relating the card credential as provided by the Card Stock Provider, via network 200, which relates to the base card rather than the attributes assigned by the PHYSAP 155.

Subsequently, the user 165 (credential holder) uses their card credential 160 at a storefront retailer/government office or kiosk/enterprise, depicted as first to third store front relying parties 170A to 170C respectively, to identify themselves in the presence of an agent of the store front relying party. The first to third store front relying parties 170A to 170C each exploit a card credential checker, referred to within this specification as a CARCREC system/device. According to the identity of the first to third store front relying parties 170A to 170C respectively these are allocated different trust levels. For example:

Trust Level 1 (TL1)—government office, civic authority, e.g. another government Photo-n) issuing authority or government/civic office where the credential holder's identity is proofed, having higher trust level than other relying parties.

Trust Level 2 (TL2)—financial institutions, e.g. a bank, having a higher trust level than other relying parties, such as retailers, etc. but not at a level not as high as relying parties at a Trust Level 1.

Trust Level 3 (TL3)—all other identity agents, not included in the above trust levels 1 and 2 respectively.

An additional trust level, Trust Level 4 (TL4), is associated with online merchants (not shown for clarity) who are also referred to as online relying parties. This trust level, TL4, may also be associated with online activities with a government, government regulated body, online enterprise etc. or such online activities may be associated with another trust level. Whilst embodiments of the invention are described as having four trust levels (TL1 to TL4 respectively) it would be evident that within alternate embodiments a higher or lesser number of trust levels may be employed. However, for each trust level the activities of a user are tracked and stored within the databases as described with respect to embodiments of the invention and employed as described below in generating an Identity Verification Score for the user with the government issued photographic card credential.

The CARCREC system, located at the store front relying party's place of business and not shown for clarity, interacts with the Attribute Provider 135 to validate the card credential 160 and verify the identity of the document bearer, user 165. Accordingly, the CARCREC system acquires data from and about the card credential 160 and communicates this to a Document Validation Identity Verification database (DVIVDb) 150 which then communicates with the DVIVE 260 within the PHYSAP 155. The DVIVE 260 thereby confirms or denies the validity of the card credential 160 presented by the user 165 at the one of the first to third store front relying parties 170A to 170C respectively. The DVIVE 260 extracts data from the Identity Attribute Database 250 and CSVVE 270, either directly or via Identity Attribute Database 250, as part of the validation activity. An exemplary validation process for a card credential 160 via CARCREC system and DVIVE 260 is depicted and described below in respect of FIGS. 4 through 8 respectively.

Accordingly, the CARCREC system validates the card credential 160 as being genuine or counterfeit. As described supra the CARCREC system extracts characteristic information from the card credential 160 which is transmitted to the DVIVDb 150 managed and controlled by Attribute Provider 135. The extracted characteristics are then provided to DVIVE 260 wherein they are compared with data extracted from Identity Attribute Database 250/CSVVE 270 and a resulting validation/denouncement of the card credential 160 is communicated back to the DVIVDb 150 and therein back to the CARCREC for presentation to the agent of the store front relying party. Extracted characteristics may include, but are not limited to, the photograph on the card credential 160, a signature, identity information of the card credential 160, barcode data, QR code data, data within magnetic stripe(s), etc. as well as potentially characteristics of the card itself, including but not limited, physical elements of the card credential 160 and invisible aspects of the card credential 160.

The data within the Identity Attribute Database 250 maintained and acquired/generated by the PHYSAP 155 relating to the card credential 160 when the user 165 applied for, or renewed, their card credential 160. Accordingly, the user 160 during the course of doing business at various retail service provider's locations, the credential holder's (user 165) card credential 160 is validated and their identity verified by Attribute Provider's 135 DVIVDb 150. Therefore, each time the user's 165 card credential 160 (or Photo-ID document) is validated and the bearer's identity is verified by the combination the CARCREC system, DVIVDb 150, and DYNE 260 as being genuine and not fake, then the credential holder's in-person verified identity is also confirmed as being genuine. As depicted and described below in respect of FIG. 8 the Attribute Provider 135 also generates one or more Identity Verification Scores (IdVS) which are subsequently stored within an Identity Verification Score database 140. As a result, CARCREC software is able to generate a quantified measure of the credential holder's identity and inform participating businesses, employers, and organizations of the strength of the credential holder's identity.

An Identity Verification Score (IdVS) may be considered to be similar to a FICO score, which is used by financial institutions to help them make complex, high-volume decisions and grant credit to a user. As described in more detail below, and as established supra, in order to create a representative IdVS for each credential holder (user 165), where their card credential 160 is verified by a CARCREC system, a trust level (TL) for each storefront relying party (Identity Agent) is established as outlined supra in dependence upon the storefront retailing party class. e.g. financial institutions have higher trust level than a retailer but not as high as a government office or civic authority office. In addition to trust level an IdVS computation according to embodiments of the invention may take into account the number of times the credential holder's photo-ID document is validated and the credential holder's identity verified.

Within other embodiments of the invention multiple biometric data elements may be combined for use within a data analytic module based upon a biometric engine which fuses information from a range of factors, biometric and non-biometric, into a single factor. Additionally, such a single factor may be used to determine authorization by comparing this factor with a threshold determined using an appropriate risk assessment module.

Figure 2:
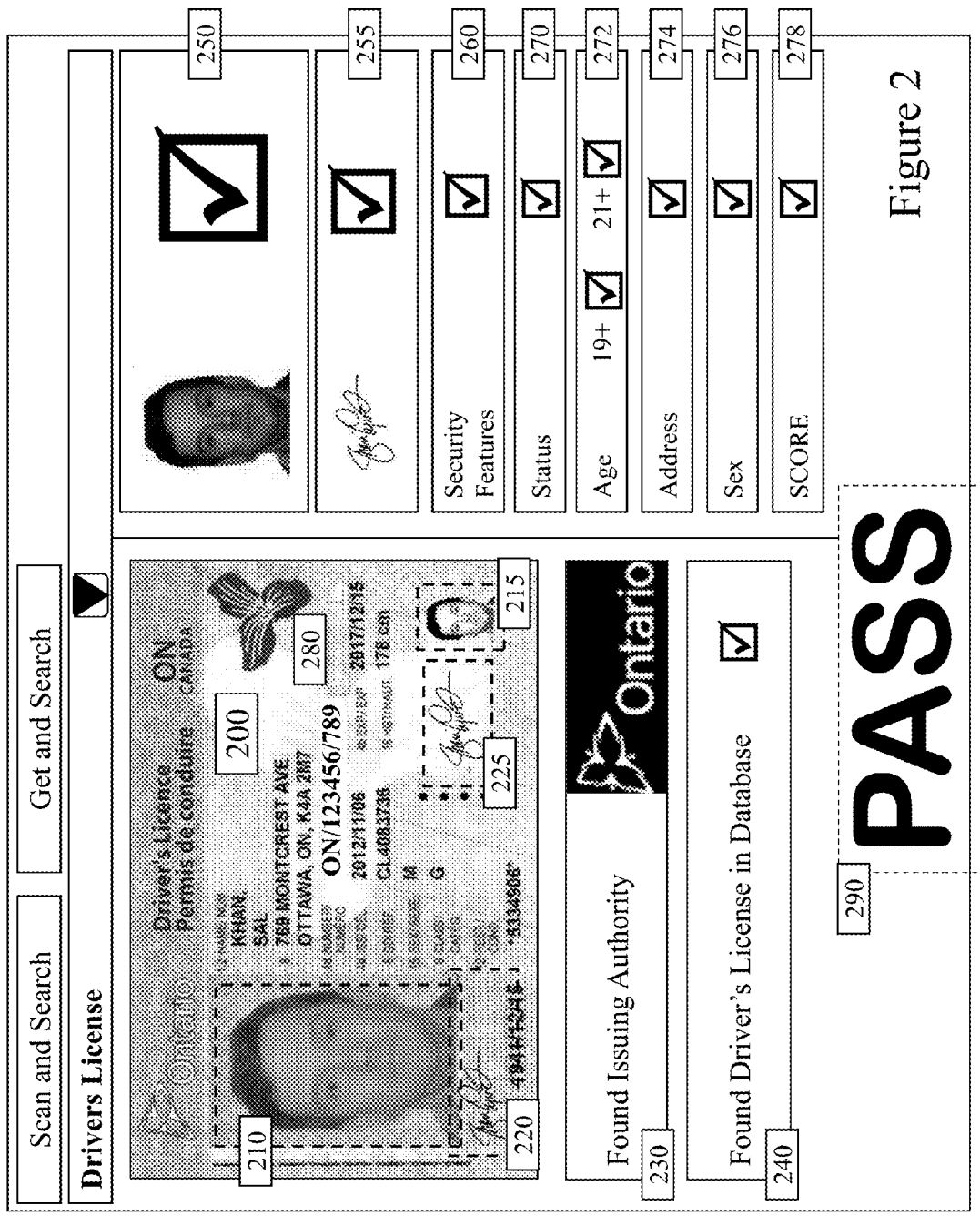
FIG. 2 depicts an identity document matching interface for a store front relying party according to an embodiment of the invention.

Now referring to FIG. 2 there is depicted an identity document matching interface for a store front relying party according to an embodiment of the invention such as presented to a store front relying party when a credential holder (user 165) presents their card credential 160 and the clerk at the store front relying party seeks to verify the user 165 with the CARCREC system. Accordingly, the clerk is presented with a user screen, wherein the authentication/verification information is provided back to the clerk upon the CARCReC system at the store front relying party. Accordingly, the clerk has scanned a user's driving license as evident from scanned image 200 which includes main photo 210, signature 220, reduced image 215 and second signature 225 together with other purporting to relate to the owner of the driving license, credential 160, where such information includes, but is not limited to, name, address, license validity, sex, date of birth and other information which may be visible or invisible exploiting infrared and/or ultraviolet sensitive inks for example either directly or through photoluminescence/fluorescence for example. Also depicted are first field 230 relating to whether the scanned card matches any issuing authority, in this case Ontario's Department of Transportation for the Province of Ontario, Canada and second field 240 indicating that the driving license has been found within the database of the issuing authority.

The matching of the credential 160 to an issuing authority may be established, for example, in dependence upon Optical Character Recognition (OCR) of one or more portions of the scanned image 200 alone or in conjunction with other aspects of the scanned image such as image pattern recognition (IPR) for example. For example, whilst IPR may determine the presence of a trillium logo and OCR may establish the presence of "ONTARIO" and/or "ON, CANADA" within the card these may be applied to a wide range of issued credentials from an issuing authority, e.g. a Province, State, Federal Authority, etc. Accordingly, additional content including, for example, OCR of "DRIVER'S LICENSE" alone or in combination with the sequence/placement of elements/text/content within the scanned image 160. The matching of the credential 160 to the issuing authority database may be based upon a search exploiting one or more recovered elements of content within the scanned image 200 such as name "KHAN, SAL" and/or number "ON/123456/789."

Where a match to the issuing authority and database for the proffered credential 160 is made then the match results in one or more items of further data verification being performed. Naturally failure to match either issuing authority or issuing authority and database may present a failed verification indication to the clerk in field 290. In this instance the items of further data verification provided to the clerk are:

First element 250 relating to verification of the image(s) with those within the issuing authority database;

Second element 255 relating to verification of the signature(s) with those within the issuing authority database;

Third element 260 relating to verification of security features being present, e.g. within an ultraviolet scan of the card performed in addition to the visible image scan;

Fourth element 270 relating to the status of the credential 160, e.g. valid, invalid, suspended;

Fifth element 272 relating to simple visual age verification against local and/or provincial and/or federal requirements, e.g. 18+, 19+, 21+ etc. in respect to services such as providing alcohol, tobacco, firearms, etc. wherein the data is based upon that within the issuing authority database rather than that appearing on the proffered credential 160;

Sixth element 274 relating to whether there is a match between the address (if present) on the proffered credential 160 with that within the issuing authority database;

Seventh element 276 relating to whether there is a match between the sex (if present) on the proffered credential 160 with that within the issuing authority database and/or correlating any images on the proffered credential 160 with that in the issuing authority database;

Eighth element 278 relating to a score based upon matches of other elements within the proffered credential 160 with those within the issuing authority database either in isolation of other matches already presented to the clerk and/or independent thereof.

Figure 3:
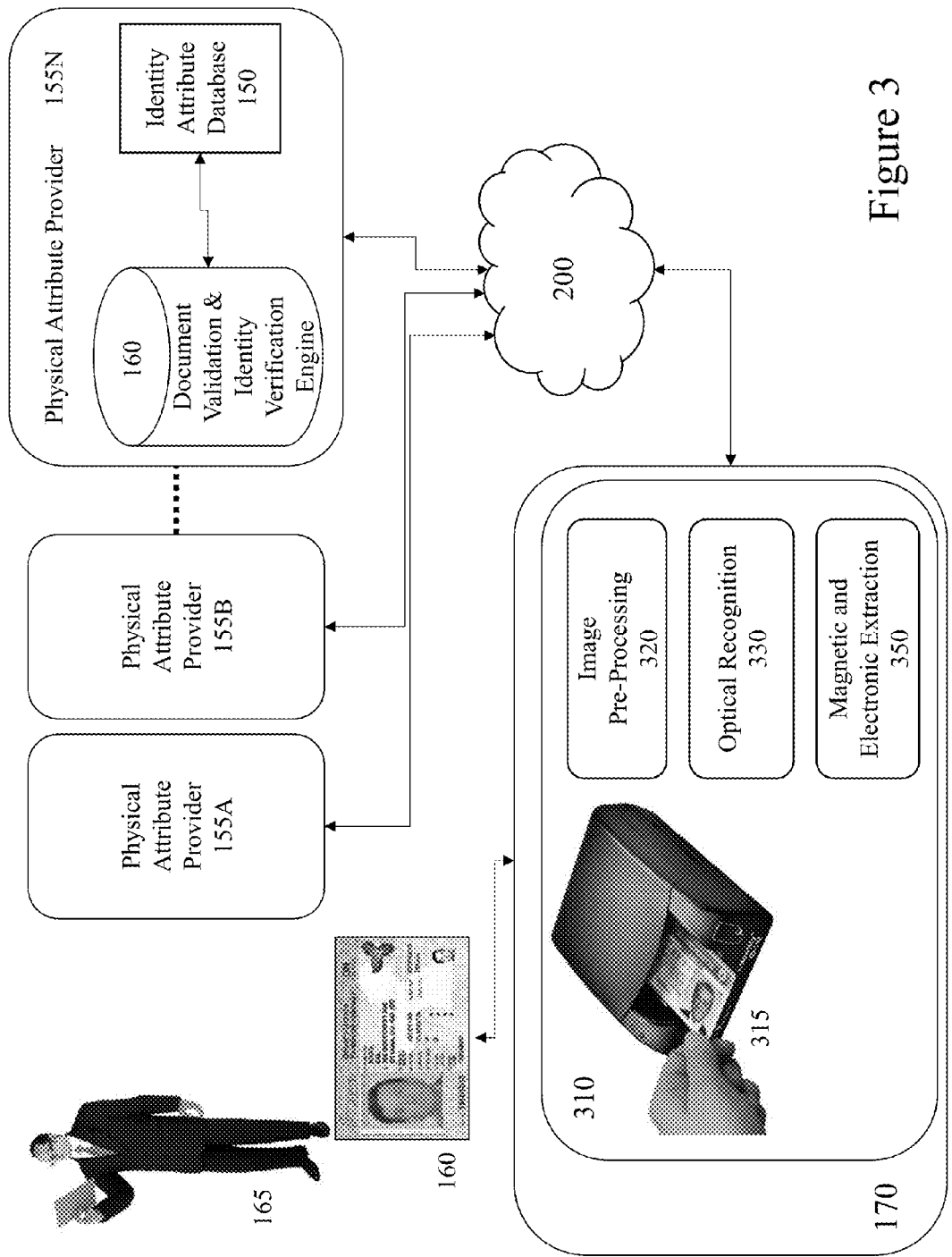
FIG. 3 depicts an identity document matching architecture at a store front relying party according to an embodiment of the invention.

Referring to FIG. 3 there is depicted a card credential matching architecture at a store front relying party according to an embodiment of the invention as part of a CCVAS such as depicted in FIG. 1 and relating to credential verification such as depicted in FIG. 2. Accordingly, part of the CCVAS is depicted by PHYSAPs 155A to 155N respectively in respect of a user 165 and their card credential 160. Accordingly, the user 165 visits a store front relying party 170, such as described supra in respect of FIG. 1. Depicted as part of store front relying party 170 is CARCREC system 310 comprising in addition to the terminal 315 modules including, but not limited to, those providing image pre-processing 320, optical character recognition (OCR) 330, and magnetic/electronic extraction 350 for example. Accordingly, the user presents their card credential 160 at the store front relying party 170 wherein an agent of the store front relying party 170 inserts the card credential 160 into the terminal 315 wherein the image pre-processing 320, optical character recognition (OCR) 330, and magnetic/electronic extraction 350 modules extract their information wherein this is communicated via network 200 to an appropriate one of the PHYSAPs 155A to 155N respectively via an Attribute Provider, not shown for clarity. For example, if the card credential 160 is a California driver's license then the PHYSAP may be part of the California Department of Motor Vehicles or alternatively if the card credential 160 is a US passport then the PHYSAP may be associated with the US Department of State.

The information derived from the card credential 160 by the CARCREC system 310 are communicated to a DVIVE 160 within PHYSAP 155 which extracts Information from the Identity Attribute Database 150 in dependence upon elements of the extracted information to establish whether the user 165 is the legitimate owner of the card credential 160 or not. The resulting determination is then provided back to the CARCREC system 310 via the Attribute Provider, not shown for clarity, for display to the agent of the store front relying party 170.

Figure 4:
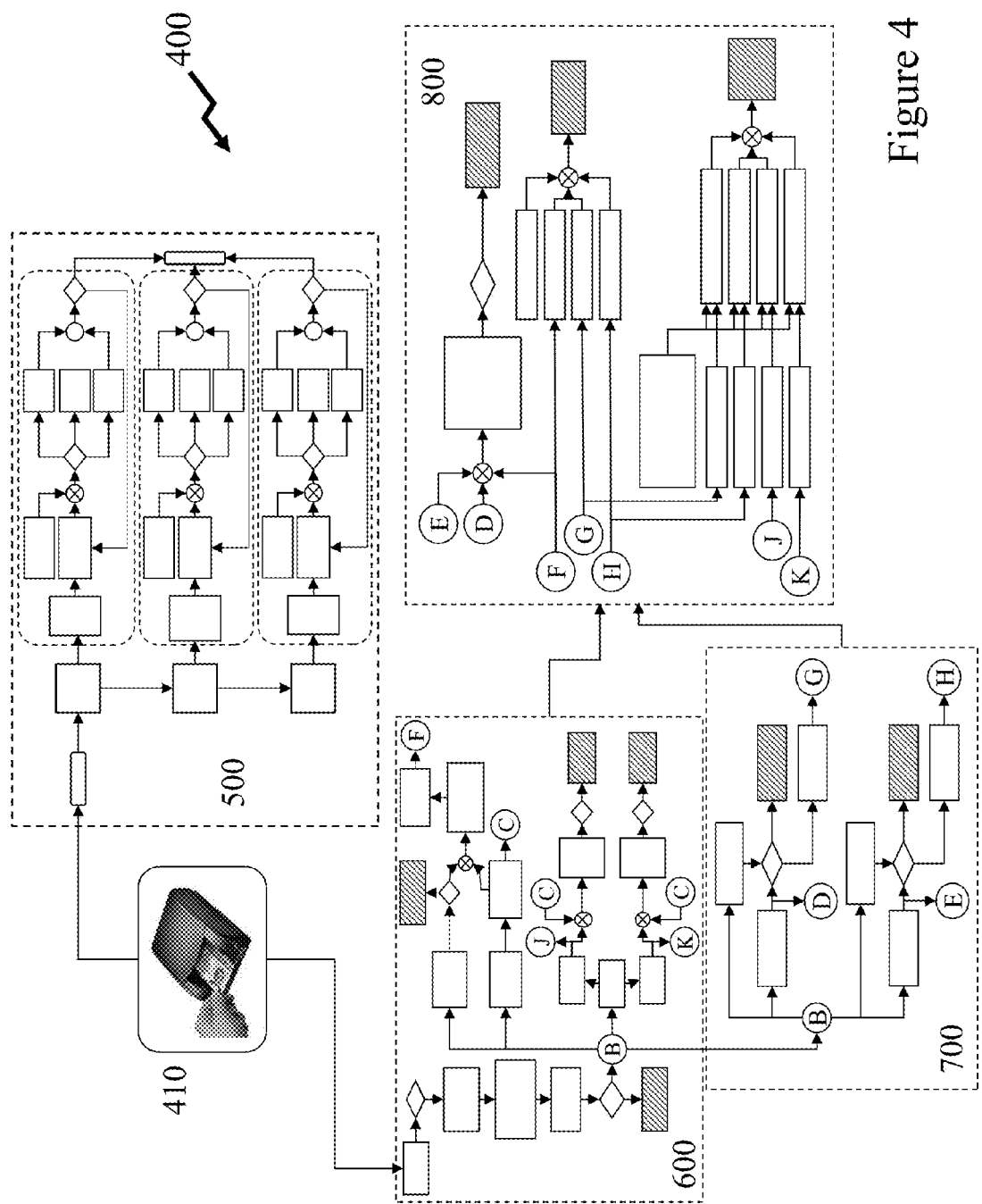
FIG. 4 depicts an exemplary process flow for establishing mechanical, non-visible, and visible features of a card according to an embodiment of the invention.
Figure 5:
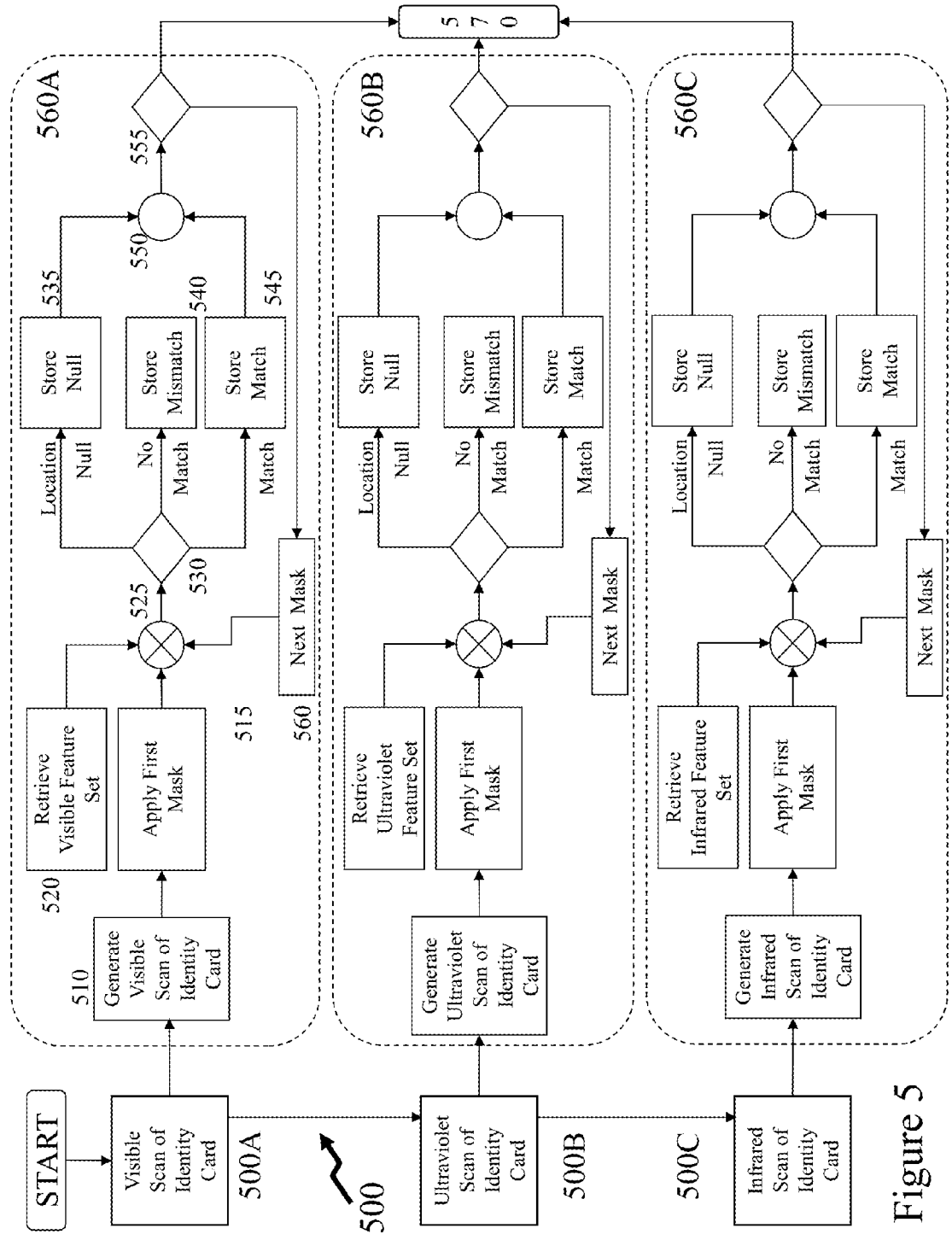
FIG. 5 depicts an exemplary process flow for establishing mechanical and non-visible features of a card according to an embodiment of the invention.

Now referring to FIG. 4 there is depicted an exemplary process flow for establishing mechanical, non-visible, and visible features of a card according to an embodiment of the invention. Accordingly, a card credential, e.g. card credential 160, is provided to a card reader, e.g. CARCRBC system 410, wherein a first process flow 500 as described below in respect of FIG. 5 proceeds to extract invisible and visible features that are unique to the physical card whereas a second process flow comprising first to third flows 600 to 800 as described below in respect of FIGS. 6 to 8 respectively extract the properties of the card specific to the PHYSAP 155 and user 165. Considering initially process flow 500 as depicted in FIG. 5 for an exemplary process flow for establishing visible and non-visible features of a card according to an embodiment of the invention. Accordingly, the process proceeds to step 500A wherein a visible process flow 560A is depicted wherein in step 510 a visible wavelength range scan of the card credential is generated and then in step 515 a mask is applied to the retrieved scan and a first portion of the visible scan is compared in step 525 with a retrieved visible feature set in step 520. Accordingly, in step 530 a determination is made wherein the process then proceeds to step 535 if a null region of the visible scan was detected, to step 540 if a mismatch between the visible scan and the plurality of features within the retrieved visible feature set is established, or to step 545 if a match is made between the visible scan and the plurality of features within the retrieved visible feature set is established. From either of steps 535 to 545 respectively the process proceeds to step 550 and therein in step 555 a determination is made as to whether all masks have been applied to the visible scan. If not the process loops back via step 560 to apply a new mask to the visible scan data and the process repeats via step 525. If the final mask has been applied then the process proceeds to step 570.

Also depicted are steps 500B and 500C respectively which relate to ultraviolet and infrared scans and link to ultraviolet process flow 560B and infrared process flow 560C respectively. These are essentially structured in the same manner as visible process flow 660A except that instead of retrieving a mechanical feature set in each of the ultraviolet process flow 560B and infrared process flow 560C respectively ultraviolet and infrared feature sets are employed. Optionally, additional process flows may be applied including a visible feature set as well as photoluminescent and fluorescent process flows wherein exposure of the card credential to one band of wavelengths is followed by monitoring/scan in another band of wavelengths. Within some embodiments of the invention the card may be scanned sequentially as it is inserted into the card reader whereas in others it may be scanned once inserted or imaged once inserted or a combination thereof.

Figure 6:
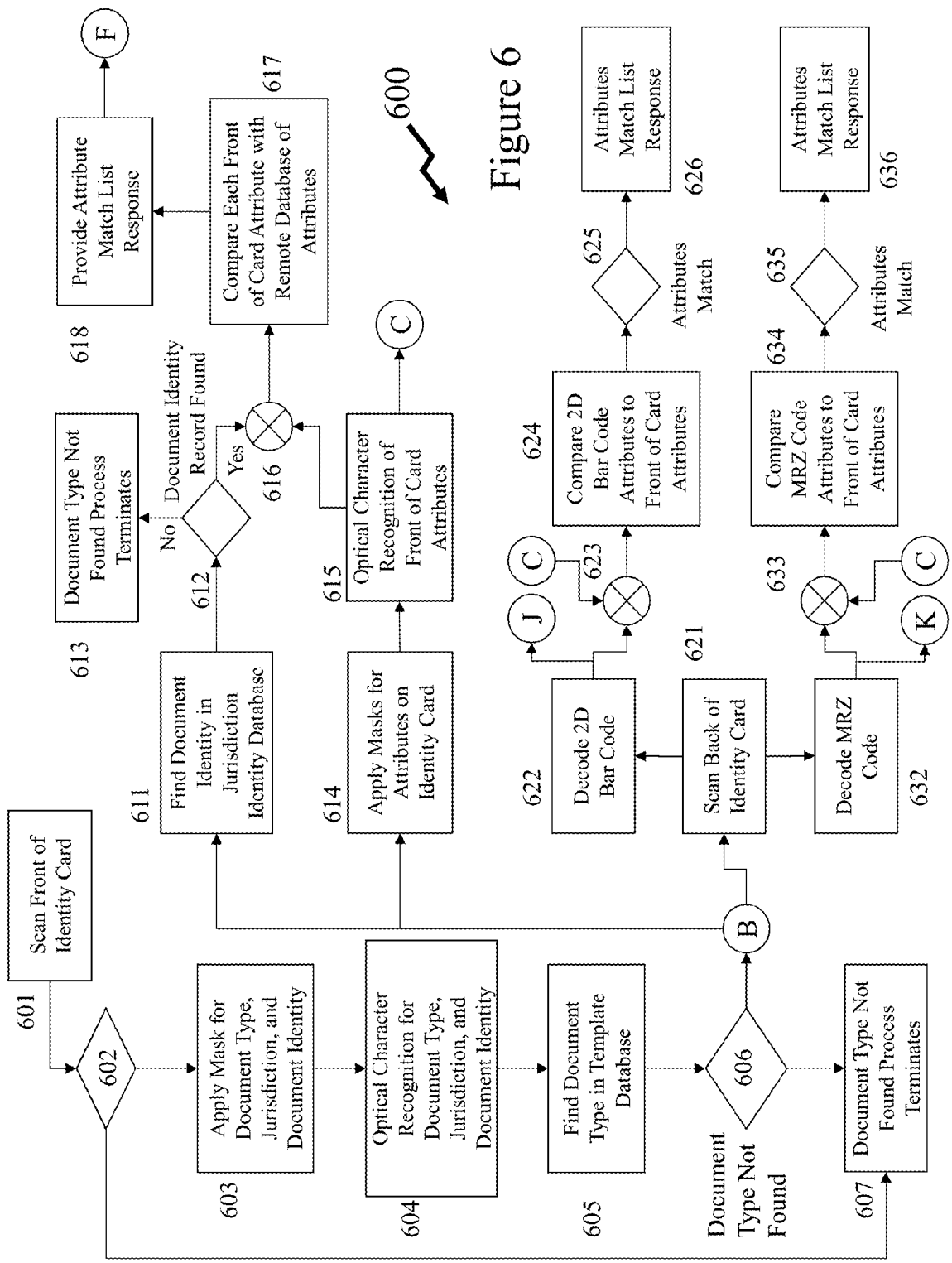
FIGS. 6 to 8 depict an exemplary process flow for establishing visible features and information from a card according to an embodiment of the invention.

Now referring to FIG. 6 there is depicted a process flow 600 forming part of a second process flow comprising first to third flows 600 to 800 as described below in respect of FIGS. 6 to 8 respectively extract the properties of the card specific to the PHYSAP 155 and user 165. As depicted the process comprises an initial process flow comprising steps 601 to 606 followed by a first process sub-flow comprising steps 611 to 618 and a second process sub-flow comprising steps 621 to 636. The initial process flow comprises:

Step 601—the front of the card credential is scanned to create an image scan of the card;

Step 602—a physical feature vector of the scanned card credential image is generated and analysed establish a feature vector to determine whether a corresponding feature vector exists for card credentials such that if a corresponding feature vector exists the process proceeds to step 603 otherwise it proceeds to step 607;

Step 603—a mask corresponding to the identified card credential type based upon the determined physical feature vector is extracted, this mask corresponding to, for example, the credential type, such that for example the card dimensions are confirmed as complying to ISO/IEC 7810 ID-1 and that the card contains an electronic circuit interface, such as electronic circuit interface 155 for example;

Step 604—optical character recognition (OCR) is performed to extract content of the card based upon, for example, a keyword set based upon the mask, e.g. an ISO/IEC 7810 ID-1 card with electronic circuit interface is typically a financial transaction card such that keywords such as Visa, MasterCard, Maestro, Expiry, etc. may be present;

Step 605—a template database of card credentials containing extracted OCR terms and matching physical layout of attributes is searched;

Step 606—a determination is made as to whether a template within the template database exists or not wherein a positive determination results in the process proceeding to "B" and therein a first process sub-flow comprising steps 611 to 618 and a second process sub-flow comprising steps 621 to 636 or proceeds to step 607; and Step 607—a determination has been made that the document type does not exist within the database and the process terminates.

A positive determination at step 606 as discussed supra results in the process proceeding to "B" and therein a first process sub-flow comprising steps 611 to 618 and a second process sub-flow comprising steps 621 to 636. Considering first process sub-flow comprising steps 611 to 618 then these steps as depicted comprise:

Step 611 an encrypted query is sent to an a card credential information database wherein document identities are stored, wherein the query comprises elements established from steps 603 to 605 for example and/or the card credential information database is established based upon elements established from steps 603 to 605 for example;

Step 612 wherein a response from the card credential Information database is received and if negative the process proceeds to step 613 otherwise it proceeds to step 616, wherein in either instance the returned message is encrypted;

Step 613 where a card credential was not found then where an agent of a store front relying party is performing the verification/authentication of the card then a response is generated and displayed to them or if this process is performed at a kiosk without an agent then a message is generated and displayed to the user at that point. A negative determination may arise even for valid card credentials if the user presenting the card credential is in a different jurisdiction to that within which the card credential was issued. For example, an individual with a HSBC credit card issued in Europe may present the credit card to a HSBC branch in the United Kingdom where the HSBC credit cards in Europe are manufactured with a different databases of features to those in North America and the records for European credit cards are not stored. Alternatively, the visual and/or physical layout of a European credit card may differ from that of the North American credit card such that the template cannot be identified. However, it is anticipated that typically a feature set for manufacturing cards according to standard card type and/or internationally agreed specification will be globally defined such that a card manufactured anywhere globally by an authorized manufacturer will employ these features such that they can be matched anywhere globally.

Figure 8:
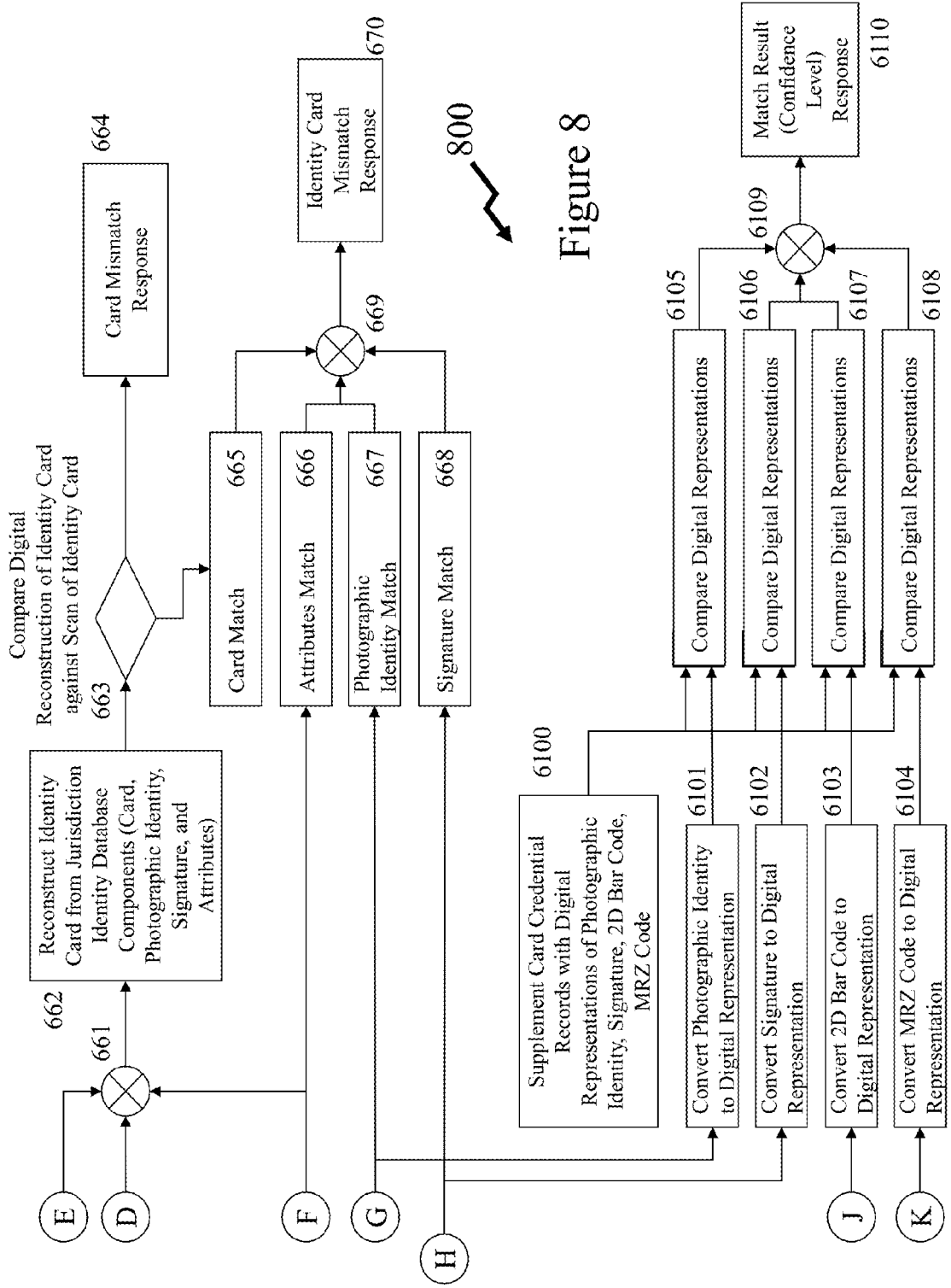

Step 614 performed in parallel to step 611 wherein an attribute mask from a template database for the document type established in step 601 through 607 is applied to the card credential;

Step 615 wherein each attribute established through the mask is subject to an OCR process to generate a set of attributes for the card credential and these attributes are provided forward as output "C" which are used as input to second process sub-flow comprising steps 621 to 636;

Steps 616 and 617 where a list of the attributes established in process step 615 are compared to those associated with the document type established in process steps 611 and 612;

Step 618 wherein those attributes matching are stored and provided forward as output "F" which is an input to the process flow 800 in FIG. 8.

Second process sub-flow comprising steps 621 to 636 comprises:

Step 621 wherein the back of card credential is scanned to create an image scan of the card credential which is then provided to steps 622 and 623;

Step 622 wherein the image scan of the card credential is processed to extract a two-dimensional (2D) bar code by masking the image of the back of the card credential and decoding the bar code, wherein this decoded bar code is provided forward as output "J" to process flow 800 in FIG. 8;

Step 623 wherein the 2D bar code extracted in step 622 and the output "C" are combined;

Step 624 wherein 2D bar code extracted in step 622 and the output "C" are compared;

Step 625 where the attributes extracted from the 2D bar code that match those extracted from the front of the card are identified as are those that not match;

Step 626 presents a list of matching attributes, see step 613 for presentation methodology;

Step 632 wherein the image scan of the card credential is processed to extract information within any Machine Readable Zone (MRZ) by masking the image of the back of the card credential and decoding the MRZ, wherein this decoded MRZ code is provided forward as output "K" to process flow 800 in FIG. 8;

Step 633 wherein the MRZ code extracted in step 632 and the output "C" are combined;

Step 634 wherein MRZ code extracted in step 632 and the output "C" are compared;

Step 635 where the attributes extracted from the MRZ code that match those extracted from the front of the card are identified as are those that not match; and Step 636 presents a list of matching attributes, see step 613 for presentation methodology.

Figure 7:
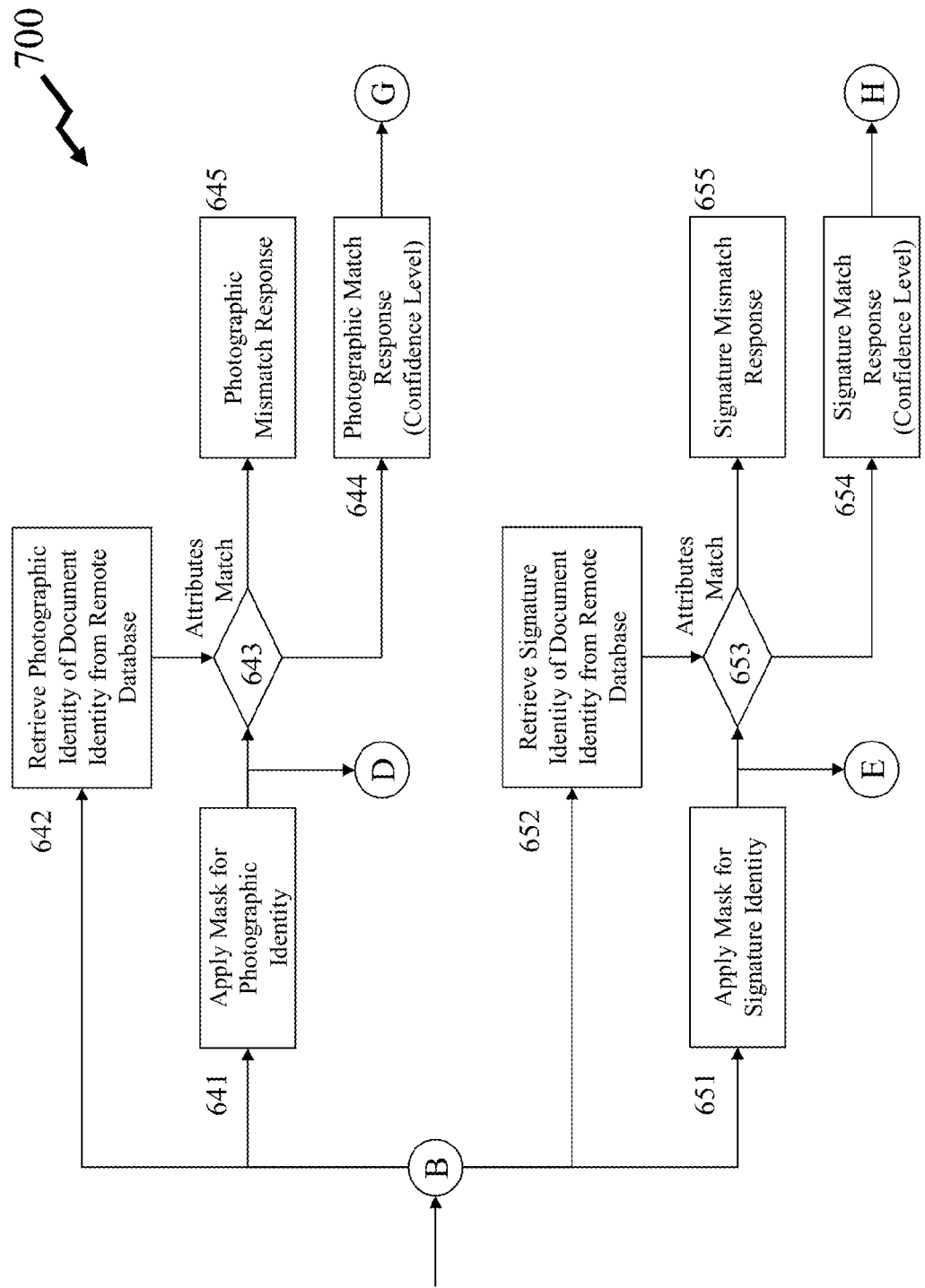

Now referring to FIG. 7 there is depicted a process flow 700 comprising steps 641 to 655 for extracting and matching any photographic element of the card credential. Accordingly, process flow 700 comprises steps:

Step 641 wherein masking is applied to the Image scan of the card to obtain any photographic element wherein this is then provided to process flow 800 as output "D" and coupled to step 643;

Step 642 wherein any photographic data stored within a card credential information database is acquired through an encryption process and provided to step 643;

Step 643 wherein the extracted photographic data from steps 641 and 642 are compared;

Step 644 wherein a mismatch determined in step 643 is presented, see step 613 for presentation methodology;

Step 645 wherein a match determined in step 643 is presented, see step 613 for presentation methodology, together with a confidence level and provided as output "G" to process flow 800;

Step 651 wherein masking is applied to the image scan of the card to obtain any signature element wherein this is then provided to process flow 800 as output "E" and coupled to step 653;

Step 652 wherein any signature data stored within a card credential information database is acquired through an encryption process and provided to step 653;

Step 653 wherein the extracted photographic data from steps 651 and 652 are compared;

Step 654 wherein a mismatch determined in step 653 is presented, see step 613 for presentation methodology; and Step 655 wherein a match determined in step 653 is presented, see step 613 for presentation methodology, together with a confidence level and provided as output "H" to process flow 800.

Now referring to FIG. 8 there is depicted process flow 800 comprising steps 661 to 670 and steps 6100 to 6110 relating to matching the card credential presented for verification/authentication with information stored within a card credential information database.

Step 661 wherein the data output from process flow 700 as outputs "D" and "E" and process flow 600 as output "F" are combined;

Step 662 wherein the card credential is reconstructed digitally from the data extracted from the card credential information database;

Step 663 wherein the digitally reconstructed card credential from step 662 is compared to the scan of the card credential ID and the process proceeds to step 664 upon mismatch or step 665 upon a match;

Step 664 wherein a mismatch determined in step 663 is presented, see step 613 for presentation methodology; and Step 665 wherein a match determined in step 663 is determined and the data is combined in step 669 with the outputs from steps 666 to 668 respectively;

Step 666 the matching attributes from output "F" of process flow 600 are fed forward to step 669;

Step 667 the matching attributes from output "G" of process flow 700 are fed forward to step 669;

Step 668 the matching attributes from output "H" of process flow 700 are fed forward to step 669;

Step 669 wherein the matching elements of steps 665 to 668 are combined and coupled to step 670; and Step 670 wherein a computational algorithm computes matching scores for the attributes from step 669 and generates an overall matching score of the scanned card credential versus the numerical representations of the digital representations of the card credential stored within the card credential information database and this is presented, see step 613 for presentation methodology.

Also depicted in process flow 800 are steps 6100 to 6110 which comprise:

Step 6100 wherein supplementary card credential database representations of one or more of photographic identity, signature, 2D bar code, and MRZ code are retrieved and coupled forward to steps 6105 to 6108 respectively;

Step 6101 wherein the photographic identity generated as output "G" from process flow 700 is processed and coupled to step 6105;

Step 6102 wherein the photographic identity generated as output "H" from process flow 700 is processed and coupled to step 6106;

Step 6103 wherein the photographic identity generated as output "J" from process flow 600 is processed and coupled to step 6107;

Step 6104 wherein the photographic identity generated as output "K" from process flow 600 is processed and coupled to step 6108;

Steps 6105 to 6108 wherein the data corresponding representations from steps 6101 to 6104 respectively are combined and compared with the data from step 6100 in order to establish a distance measurement by calculations using one or more algorithms known within the prior art;

Step 6109 where the results from steps 6105 to 6108 respectively are combined to yield an overall measure of authenticity of the card credential;

Step 6110 wherein the result from step 6109 is presented, see step 613 for presentation methodology.

The discussion and description in respect of Figures supra in respect to process flows for the verification and authentication of a card credential comprising features relating to the base card credential itself and the information relating to the user of the card credential are described from the perspective of the process being performed at a card reader or locally to the card reader as information relating to the base card credential and user information are transmitted to the card reader or local processor for comparison to the features and information generated at the initial generation of the base card credential and its association to the user. However, it would be evident that alternatively the extracted features and information from the card reader may alternatively be transmitted to a remote server for comparison to the features and information generated at the initial generation of the base card credential and its association to the user. Accordingly, as described in respect of FIG. 1 this remote server may be controlled by a PHYSAP 155 for example.

Figure 9:
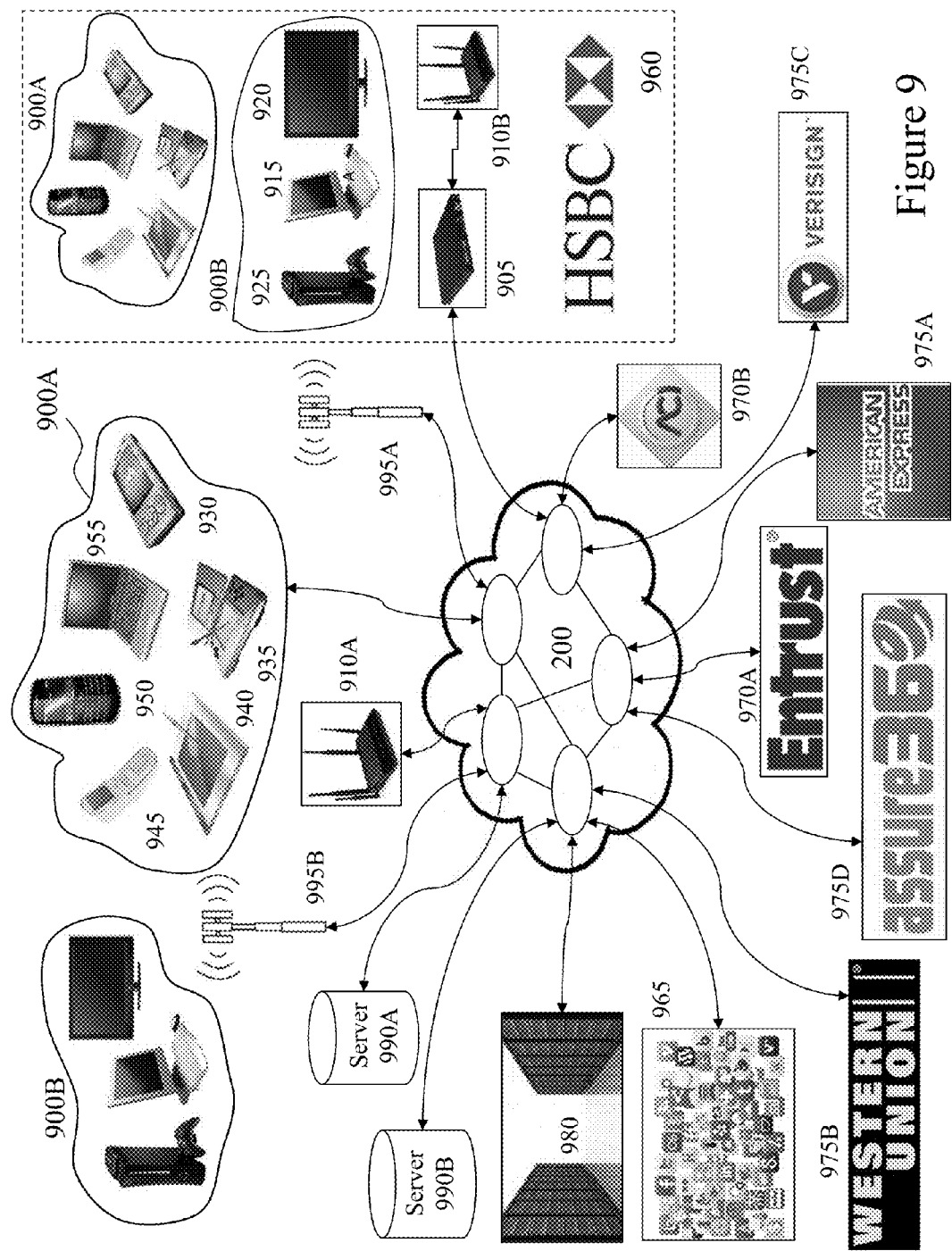
FIG. 9 depicts a network environment within which embodiments of the invention may be employed.

Referring to FIG. 9 there is depicted a network 200 within which embodiments of the invention may be employed supporting card credential verification and authentication services (CCVAS) according to embodiments of the invention. Such CCVASs, for example supporting activities such as the establishment of real world identity assurance, Level 3 assurance to physical store front relying enterprises, the binding of real world identity to electronic devices, and the provisioning of Level 3 identity verification to online retail relying enterprises. As shown first and second user groups 900A and 900B respectively interface to a telecommunications network 200. Within the representative telecommunication architecture a remote central exchange 980 communicates with the remainder of a telecommunication service providers network via the network 200 which may include for example long-haul OC-48/OC-192 backbone elements, an OC-48 wide area network (WAN), a Passive Optical Network, and a Wireless Link. The central exchange 980 is connected via the network 200 to local, regional, and international exchanges (not shown for clarity) and therein through network 200 to first and second cellular APs 995A and 995B respectively which provide Wi-Fi cells for first and second user groups 900A and 900B respectively. Also connected to the network 200 are first and second Wi-Fi nodes 910A and 910B, the latter of which being coupled to network 200 via router 905. Second Wi-Fi node 910B is associated with Enterprise 960, e.g. HSBC™, within which are additional first and second user groups 900A and 900B. Second user group 900B may also be connected to the network 200 via wired interfaces including, but not limited to, DSL, Dial-Up, DOCSIS, Ethernet, G.hn, ISDN, MoCA, PON, and Power line communication (PLC) which may or may not be routed through a router such as router 905.

Within the cell associated with first AP 910A the first group of users 900A may employ a variety of PEDs including for example, laptop computer 955, portable gaming console 935, tablet computer 940, smartphone 950, cellular telephone 945 as well as portable multimedia player 930. Within the cell associated with second AP 910B are the second group of users 900B which may employ a variety of FEDs including for example gaming console 925, personal computer 915 and wireless/Internet enabled television 920 as well as cable modem 905. First and second cellular APs 995A and 995B respectively provide, for example, cellular GSM (Global System for Mobile Communications) telephony services as well as 3G and 4G evolved services with enhanced data transport support. Second cellular AP 995B provides coverage in the exemplary embodiment to first and second user groups 900A and 900B. Alternatively the first and second user groups 900A and 900B may be geographically disparate and access the network 200 through multiple APs, not shown for clarity, distributed geographically by the network operator or operators. First cellular AP 995A as show provides coverage to first user group 900A and environment 970, which comprises second user group 900B as well as first user group 900A. Accordingly, the first and second user groups 900A and 900B may according to their particular communications interfaces communicate to the network 200 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 900A may form associations either through standards such as IEEE 802.15 and Bluetooth as well in an ad-hoc manner.

Also connected to the network 200 are Social Networks (SOCNETS) 1165, first and second Attribute Providers 970A and 970B respectively, e.g. Entrust™ and ACI Worldwide™, first and second card credential providers 975A and 975B respectively, e.g. American Express™ and Western Union™, and first and second Authentication Services 975C and 975D respectively, e.g. Verisign™ and Assure 360™, as well as first and second servers 990A and 990E which together with others, not shown for clarity. First and second servers 990A and 990B may host according to embodiments of the inventions multiple services associated with a provider of publishing systems and publishing applications/platforms (CCVASs); a provider of a SOCNET or Social Media (SOME) exploiting CCVAS features; a provider of a SOCNET and/or SOME not exploiting CCVAS features; a provider of services to PEDS and/or FEDS; a provider of one or more aspects of wired and/or wireless communications; an Enterprise 1160 exploiting CCVAS features; license databases; content databases; image databases; content libraries; customer databases; websites; and software applications for download to or access by FEDs and/or PEDs exploiting and/or hosting CCVAS features. First and second primary content servers 990A and 990B may also host for example other Internet services such as a search engine, financial services, third party applications and other Internet based services.

Accordingly, a user may exploit a PED and/or FED within an Enterprise 1160, for example, and access one of the first or second servers 990A and 990B respectively to perform an operation such as accessing/downloading an application which provides CCVAS features according to embodiments of the invention; execute an application already installed providing CCVAS features; execute a web based application providing CCVAS features; or access content. Similarly, a user may undertake such actions or others exploiting embodiments of the invention exploiting a PED or FED within first and second user groups 900A and 900B respectively via one of first and second cellular APs 995A and 995B respectively and first Wi-Fi nodes 910A.

As noted supra first and second servers 990A and 990B together with others may host a variety of software systems and/or software applications supporting embodiments of the invention. However, embodiments of the invention may not only operate locally, regionally, or nationally but internationally and globally. Accordingly, some servers may manage and control operations in execution upon other servers. For example, an Authentication Service such as Authentication Service 290 in FIG. 2 (e.g. Assure360) may operate a server or servers within one or more jurisdictions which authenticate, using one or more machine authentications techniques servers, within that jurisdiction as well as other jurisdictions. Each jurisdiction server may be operated by the same Authentication Service as manages the supervisory servers or it may be operated by one or more Identity Authority Servers authorised by the Authentication Service managing the supervisory servers. Optionally, such providers of Authentication Services may be regulated by government regulatory bodies within their respective jurisdictions. As noted supra as the verification processes are performed on firewalled servers associated with the physical attribute provider (PHYSAPs) then data relating to true original government issued photographic card credentials is maintained secure and private whilst the only information transmitted from a store front relying party is the extracted data for the presented government issued photographic card credential and that transmitted from a PHYSAP is the result of the verification/validation process. Similarly, data transmitted from an Attribute Provider is restricted, e.g. only the Identity Verification Score (IdVS) provided from the Attribute Provider server, e.g. CARCREC server, to the card reader at the store front relying party, e.g. CARCREC system 410.

Accordingly, where government issued photographic identity cards are standardized, e.g. driver' licenses in all member states of the European Community, then the processes relating to the store front relying parties may be similarly tracked and employed across multiple jurisdictions. Alternatively, the user may transact business within another jurisdiction based upon the validation and verification of their identity. In such instances where a jurisdiction server (e.g. a country server) is transacting on behalf of a user (e.g. doing business or presenting their government issued photographic identity card) in another jurisdiction (e.g. country) then the two jurisdiction servers will first identify themselves before the user's digital identity will be assured by the jurisdiction server in the jurisdiction they live. Due to different provincial, state, territorial, differences such jurisdictions may include different states, regions, territories, etc., for example.

It would be evident that authentication may be conducted by an online relying party in the country in which the user is conducting business or by the user's Identity Provider (if the user uses one), if the online relying party the user is transaction with is networked with the user's Identity Provider. It would be evident that some enterprises and/or organizations acting as online relying parties, e.g. Google, American Express, HSBC and Facebook, may act as global identity providers whereas other online relying parties, e.g. Verizon and Chase Manhattan, may be only US identity providers.

Figure 10:
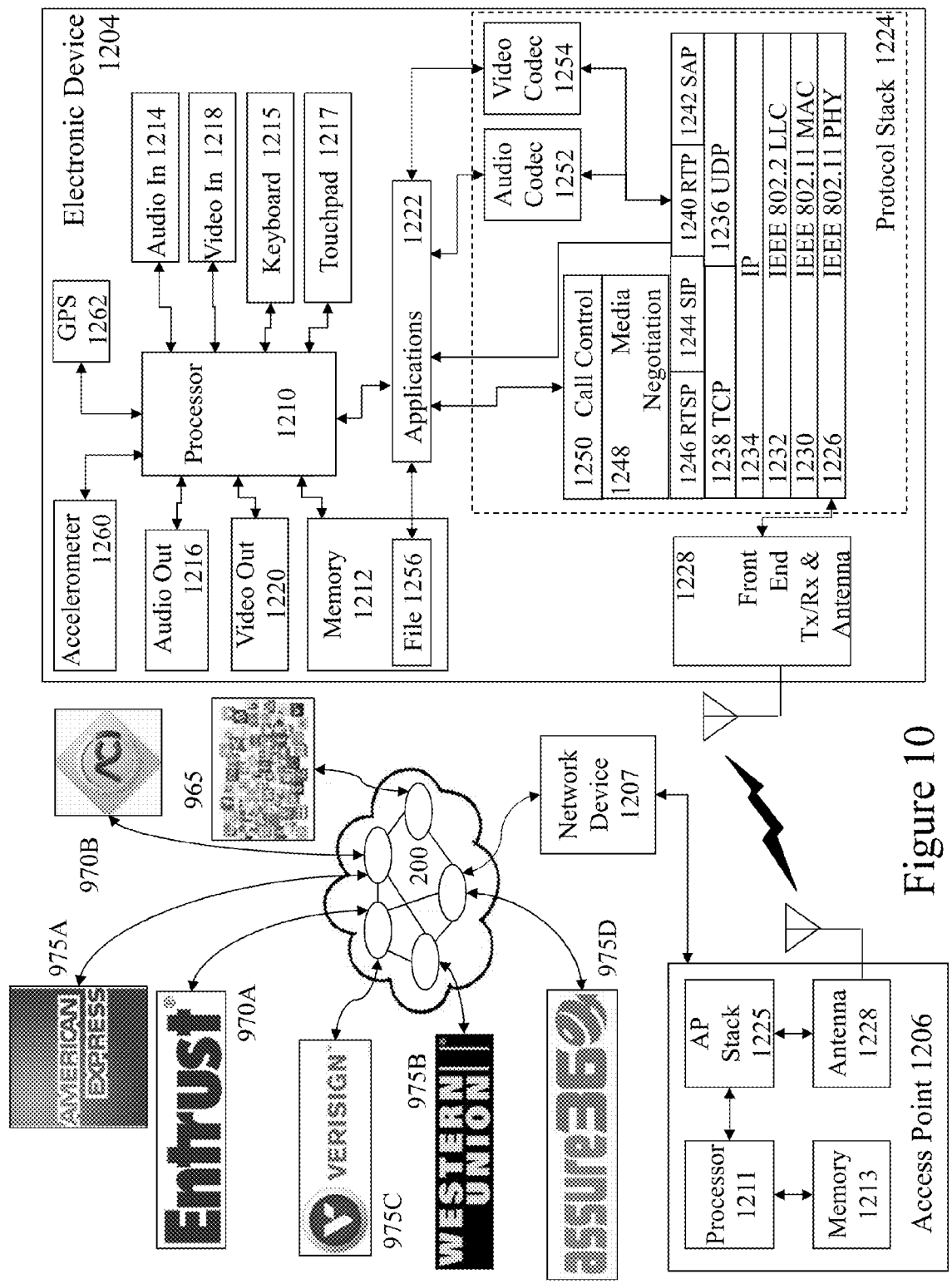
FIG. 10 depicts a wireless portable electronic device supporting communications to a network such as depicted in FIG. 6 and as supporting embodiments of the invention.

Now referring to FIG. 10 there is depicted an electronic device 1004 and network access point 1007 supporting CCVAS features according to embodiments of the invention. Electronic device 1004 may, for example, be a PED and/or FED and may include additional elements above and beyond those described and depicted. Also depicted within the electronic device 1004 is the protocol architecture as part of a simplified functional diagram of a system 1000 that includes an electronic device 1004, such as a smartphone 1155, an access point (AP) 1006, such as first AP 910, and one or more network devices 1007, such as communication servers, streaming media servers, and routers for example such as first and second servers 990A and 990B respectively. Network devices 1007 may be coupled to AP 1006 via any combination of networks, wired, wireless and/or optical communication links such as discussed above in respect of FIG. 9 as well as directly as indicated. Network devices 1007 are coupled to network 200 and therein Social Networks (SOCNETS) 1165, first and second Attribute Providers 1170A and 970B respectively, e.g. Entrust™ and ACI Worldwide™, first and second government photographic identity providers 975A and 975B respectively, e.g. American Express™ and Western Union™, and first and second Authentication Services 975C and 975D respectively, e.g. Verisign™ and Assure 360™.

The electronic device 1004 includes one or more processors 1010 and a memory 1012 coupled to processor(s) 1010. AP 1006 also includes one or more processors 1011 and a memory 1013 coupled to processor(s) 1010. A non-exhaustive list of examples for any of processors 1010 and 1011 includes a central processing unit (CPU), a digital signal processor (DSP), a reduced instruction set computer (RISC), a complex instruction set computer (CISC) and the like. Furthermore, any of processors 1010 and 1011 may be part of application specific integrated circuits (ASICs) or may be a part of application specific standard products (ASSPs). A non-exhaustive list of examples for memories 1012 and 1013 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 1004 may include an audio input element 1014, for example a microphone, and an audio output element 1016, for example, a speaker, coupled to any of processors 1010. Electronic device 1004 may include a video input element 1018, for example, a video camera or camera, and a video output element 1020, for example an LCD display, coupled to any of processors 1010. Electronic device 1004 also includes a keyboard 1015 and touchpad 1017 which may for example be a physical keyboard and touchpad allowing the user to enter content or select functions within one of more applications 1022. Alternatively the keyboard 1015 and touchpad 1017 may be predetermined regions of a touch sensitive element forming part of the display within the electronic device 1004. The one or more applications 1022 that are typically stored in memory 1012 and are executable by any combination of processors 1010. Electronic device 1004 also includes accelerometer 1060 providing three-dimensional motion input to the process 1010 and OPS 1062 which provides geographical location information to processor 1010.

Electronic device 1004 includes a protocol stack 1024 and AP 1006 includes a communication stack 1025. Within system 1000 protocol stack 1024 is shown as IEEE 802.11 protocol stack but alternatively may exploit other protocol stacks such as an Internet Engineering Task Force (IETF) multimedia protocol stack for example. Likewise AP stack 1025 exploits a protocol stack but is not expanded for clarity. Elements of protocol stack 1024 and AP stack 1025 may be implemented in any combination of software, firmware and/or hardware. Protocol stack 1024 includes an IEEE 802.11-compatible PHY module 1026 that is coupled to one or more Front-End Tx/Rx & Antenna 1028, an IEEE 802.11-compatible MAC module 1030 coupled to an IEEE 802.2-compatible LLC module 1032. Protocol stack 1024 includes a network layer IP module 1034, a transport layer User Datagram Protocol (UDP) module 1036 and a transport layer Transmission Control Protocol (TCP) module 1038.

Protocol stack 1024 also includes a session layer Real Time Transport Protocol (RTP) module 1040, a Session Announcement Protocol (SAP) module 1042, a Session Initiation Protocol (SIP) module 1044 and a Real Time Streaming Protocol (RTSP) module 1046. Protocol stack 1024 includes a presentation layer media negotiation module 1048, a call control module 1050, one or more audio codecs 1052 and one or more video codecs 1054. Applications 1022 may be able to create maintain and/or terminate communication sessions with any of devices 1007 by way of AP 1006. Typically, applications 1022 may activate any of the SAP, SIP, RTSP, media negotiation and call control modules for that purpose. Typically, information may propagate from the SAP, SIP, RTSP, media negotiation and call control modules to PHY module 1026 through TCP module 1038, IP module 1034, LLC module 1032 and MAC module 1030.

It would be apparent to one skilled in the art that elements of the electronic device 1004 may also be implemented within the AP 1006 including but not limited to one or more elements of the protocol stack 1024, including for example an IEEE 802.11-compatible PHY module, an IEEE 802.11-compatible MAC module, and an IEEE 802.2-compatible LLC module 1032. The AP 1006 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 1004 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Accordingly whilst prior art systems today try to reduce Identity fraud by determining if attribute information on the front side of identity documents including photo ID cards, matches user attribute information found on magnetic stripes and barcodes on the ID document. The solution present herein uses matching combination of face detection, face recognition, signature recognition and image matching to authenticate the ID document against the original data from which the ID document was created. The original data includes but is not limited to a photo and signature that was captured at the time the bearer applied for or renewed the ID document. Attributes, Photo ID, signature, 2D bar code and MRZ code images can then be compared between the ID document and the jurisdiction's identity database leading to stronger confidence that the card was issued by the jurisdiction and is genuine and not a counterfeit.

To confirm the genuineness of a presented photo identity document, an identity document authenticity and attribute verification solution have been developed. Using a terminal that reads the identity document, and software that analyzes and compares the information captured by the terminal against the bearer's information stored in the issuer's database, a genuine ID document is identified and a counterfeit identity document detected.

The disclosed system and method work in conjunction with the document issuer's identity document database, such as a driver's license or health-card issuer's database. The disclosed system and method confirms in seconds whether the identity document held by the individual is genuine, and is the one issued to the individual by the identity document issuing authority. Accordingly, whereas, current solutions expose personal information to storefront merchants and do not validate against the issuer's database, or only validate the attribute data and thus are not effective against altered and counterfeit documents, the solution disclosed herein is significantly more efficient and effective.

The disclosed solution proposes a unique multi-stage validation/verification process.

The presented ID document image is captured and dealt with as a whole document and also as separate component sub-images. A Document number is captured for indexing and origination information comparison purposes. Attributes or character based data is captured from the image using standard Optical Character Recognition and converted to text and matched against the corresponding data in the originating data base. The photo is identified; the face is located; the feature points on the face mapped; the facial image is normalized; the image is converted to a feature vector using a combination of different algorithms; and, the feature vector is matched to the feature vector in the originating database. The signature is identified and a process very similar to the photo matching process is followed. The signature is located; the feature points on the signature mapped; the signature image is normalized; the image is converted to a feature vector using a combination of different algorithms; and, the feature vector is matched to the feature vector in the originating data base.

The solution identifies counterfeit, counterfeit or altered identity documents to help companies, retailers and enterprise reduce fraud, prevent identity theft, secure physical access, and assist with compliance. An understanding of the card assembly process will assist in understanding what the correct components are. In the case of the Driver's License, for example, when a person renews their driver's license, the following actions are performed:

Confirm identity by showing one or more documents, preferable Government issued;
New Photo ID is taken;
Updated signature is stored;
Health related questions are asked, e. g. do you wear corrective lens to drive?; and
Information stored into database with associations to user ID and/or document ID.

In the method and system disclosed, the ID document is scanned and the images are compared to information obtained from the ID issuing authority and stored in a database. The first step in the ID document Match Algorithm is to pre-process the image captured from the ID card. As such the attributes printed on the card are viewed as an image which is then processed. If an initial identification of the card issuer can be made from features/information then those areas on the card which can be assigned to their separate components such as Photo ID, Signature, barcodes and Unique Card ID and markings as well as Attributes etc. can be automatically established from a template or mask of the ID document. Otherwise more advanced processing is required to define and isolate these regions and/or information defining the card issuing authority. The Unique Card ID and markings and Attributes may be grouped within the same image or may be separated into separate images. This depends on the location of the Unique Card ID and markings on the card. If the Unique Card ID and markings can be cleanly separated from the Attributes, it is best to process those components separately.

The next step is to identify the Unique Card ID. This is used to find the corresponding card in the jurisdiction identify database so a comparison can be performed. It is expected that the Unique Card ID be identified with high yield. In an embodiment, the Unique Card ID is found using Optical Character Recognition on the image of the card's attributes. Subsequent steps can be performed in parallel and/or serially, namely, a) compare the Photo ID on the card to the Photo ID in the database using a combination of algorithms to compare the photo image obtained from the scan of the card and a corresponding image or information in the database. For the photo image, it is preferable that the dimensions match. Compare card image to corresponding image in the database; b) Compare the image of the signature on the card to the Signature in the Database.

Then, the card attributes are processed using Optical Character Recognition and the Attributes on the card are compared to the attributes in the Database. Finally, the results are collated. It is not expected that perfect matches will always be found for the Photo ID, Signature and Attributes. Thus, in some embodiments, a threshold will be applied to the Photo ID, Signature and each individual attribute either individually or in combination.

In an embodiment, the overall result is displayed on a display device as a Green/Red indicator or checkmark, meaning that there is an acceptable match or an unacceptable match respectively. A photo of the document bearer may also be displayed. For certain steps text processing is required to increase the contrast between the text and the background. In some embodiments Optical Character Recognition is used to convert the image into an unformatted text string. Then, the unformatted text string to find attributes within the string. For any face recognition component, in general, a 3D face recognition system is best for recognizing human faces. However, in the present disclosure, it is always the same image that is printed on the ID document, so, with the card inserted into a card reader then the lighting conditions are of higher reproducibility and the facial expression is always the same. Therefore, a less complex set of algorithms can be chosen. In general, facial recognition includes:
    Locate the face or components of the face;
    Locate the feature points on the face or components of the face. Normalize the image or images (could be 2D or 3D if depth information is available);
    Convert the image or images into a feature vector(s); and
    Compare the feature vector in conjunction with the other algorithms used.

In an embodiment, the following steps are used for face recognition component.
    Convert the face image into a set of features (Local binary patterns, gabor wavelet, etc.);
    Use a program, such as Adaboost, to train a classifier for each person; and
    Use the learned classifier to determine if an image belongs to person X or not.

For the handwriting recognition, in some embodiments, there is no need to worry about the variation on stroke or movement. Because it is always the same image that is printed on the document, such as a driver license, a method of image recognition that is less complex can be used. The method can be optimized for speed and accuracy. [0036] In general handwriting recognition includes:
    Locate the signature;
    Locate the feature points on the signature;
    Normalize the image;
    Convert the image into a feature vector; and
    Compare the feature vector.

In an embodiment, handwriting recognition can include the following:
    Convert the signature image into a set of features (local features (area, junction, perimeter, length, angle, etc.), global features (size, width, height, frequency, amplitude, etc.);
    Use a program, such as Adaboost, to train a classifier for each person;
    Use the learned classifier to determine if a signature belongs to person X or not;
    Image Matching includes a menu of techniques for processing and comparing images and cropped images from the photo ID card. The techniques for image processing include: e.g. face location and recognition, eyes location and recognition, normalization of the facial image, conversion of image into a feature vector. The techniques for comparing images and cropped images from the photo ID card include, but are not limited to, comparison of feature vector of the photo ID card to the stored photo Id card, feature vector, comparison of the feature vector of the photo ID cropped image to the stored photo Id feature vector, comparison of the feature vector of the signature cropped image to the stored signature feature vector.

The above techniques can be used in varying degrees to determine the authenticity or validity of the photo ID card. Usage of specific techniques depends on factors such as the quality of the image, illumination intensity and density of the image. In the context of facial and handwriting recognition, classifier technique exploit function mapping of a feature space to a set of class labels. In general training a classifier comprises: 1. Collect a training set; 2. Manually label training set; 3. Run the training algorithm to train a classifier; 4. Collect a test set; 5. Manually label the test set; and 6. Apply the learned classifier on the test set to measure the performance of the classifier.

Within an embodiment of the invention, such as described above in respect of FIGS. 1 to 10 then the ID document matching system/methods and architecture allow a person sitting with a terminal, who may be for example, a clerk in a convenience store selling lottery tickets, alcohol or cigarettes, where age of majority is checked, or a bank clerk preparing to open a new bank account to verify the ID document (credential 165) provided to them. Within the following description the assumption is that a Driver's License is the proffered ID document used to validate the consumer's identity. However, as noted above the credential 165 may any other verified issued credential, preferably with a photograph and also preferably issued by a Governmental agency. The following steps may be taken:
  1. The ID document (e.g. driver's license) is placed or Inserted Into an imaging device such as scanner or in front of a camera to create an image scan of the card;
  2. The image scan is optionally encrypted and sent to a Verification Server; and
    A. At the Verification Server, the image is decrypted;
    B. Image pre-processing and filtering is performed to find the areas associated with the document type, jurisdiction and Document ID on the ID document;
    C. Optical Character Recognition is performed on the ID document to decode these attributes;
    D. Further image filtering is performed to get the photo ID and signature from the ID document;

3. Based on the document type and jurisdiction, an encrypted query with the Document ID is sent to the jurisdiction identity database to retrieve the photo and signature associated with the Document ID;
   A. The encrypted query is received by the jurisdiction identity information database;
   B. The query is decrypted and the query is decoded;
   C. The jurisdiction identity database searches for the Document ID;
      I) If not found, it returns an encrypted 'Document ID was not found' response;
      II) If found, it returns an encrypted response containing the photo ID, barcode and signature Image templates;
4. The response from the jurisdiction identity information server is decrypted by the Verification server.
   A. If the Document ID was not found, then a No Match response is returned to the clerk;
   B. If the document was found, one or more Matching algorithms are applied to the Photo ID, signature, barcode, and attribute match list returned from the jurisdiction's identity database. If the images match within a specified confidence level, then the photo ID is considered a match.
5. If the photo ID, barcode, and signature from the card matches the Photo, barcode, and Signature from the jurisdiction identity database, then a match result is returned to the clerk.
6. In some embodiments, a barcode from the card is compared with a barcode in the jurisdiction identity database. If the barcode matches, then a barcode match result is also returned to the user device; and
7. In some embodiments, a signature from the card is compared with a signature in the jurisdictional identity database.

With respect to the method of scanning the front of a card then the following process may be executed
   The front of the ID document is scanned to create an image scan of the card;
   A feature vector of the scan of the card is calculated and compared to the feature vector of the card stored in the jurisdiction identity database. This is referred to as the 'Holistic card comparison';
   Image pre-processing and filtering is performed to find the areas associated with the document type, jurisdiction and Document ID on the ID document;
   Optical Character Recognition is performed on the ID document to decode these attributes;
   A template database of ID documents containing the physical layout of attributes is based on document type, jurisdiction and vintage (year of introduction);
   The Template database is checked to see if the Document type and jurisdiction is present; and
   If not present in the Template database, an encrypted 'Document Type not found' response is sent to the client.

This flow defines two outputs that are used in other process flows:
   Scan of the front of the ID document
   Scan of the front of the ID document with document type and jurisdiction of the ID document In some embodiments, the front and back of the card are scanned simultaneously. In the case where the ID document is a passport, the scanner scans the passport flat face down on the scanner.

With respect to the method for matching attributes on the front of the card to attributes found in the remote database of the jurisdiction from which the ID document was issued. In some embodiments, the attributes are matched one attribute at a time. An example of a process may be as follows:
   An encrypted query is sent to the jurisdiction identity information database, a remote database, where the Document ID record is stored;
   If the document ID record is not found, then other steps are skipped, but if the document ID record is found, the other steps are performed. In both cases, the returned message is encrypted;
   An encrypted 'document not found' response is returned to the scan location and displayed to the user;
   Attribute Masks from the template database for the document type are applied to the ID document;
   Each attribute mask is subjected to OCR to find the attribute. This produces a list of attributes for the ID document;
   The attributes acquired are compared to the stored attributes 12; and
   The comparison provides a list of attribute matches between ID document attributes and the original jurisdiction identity database attributes from which the card was created. If attributes change over time, this can be detected at this step.

This flow defines two outputs that are used in other process flows:
   Document Type, Jurisdiction, Document ID and Attributes for the ID document
   Attributes on card and in jurisdiction identity database match With respect to the method for scanning the back of the card to decode the 2D bar code and the MRZ code. A method for matching attributes between the front of the ID document and the 2D bar code may be as follows:
   The back of the ID document is scanned to create an image scan of the card;
   The template database is used to find the 2D bar code on the scanned back of the ID document. This 2D bar code is masked and decoded resulting in a list of attributes that can be related to attributes on the front of the card;
   The attributes from the 2D bar code and the attributes from the front of the card (C) are used;
   Attributes between the 2D bar code and the front of the card attributes are compared;
   One by one of the attribute pairs are matched resulting in an attribute match list; and
   A list of the attribute matches is returned to the client.

In the case of an attribute mismatch, the actual value of attribute from the jurisdiction remote identity information database should not be returned to the client. An example of a me method for matching attributes between the front of the ID document and the MRZ code may be as follows:
   The template database is used to find the MRZ code on the scanned back of the ID document. This MRZ code is masked and decoded resulting in a list of attributes that can be related to attributes on the front of the card;
   The attributes from the MRZ code and the attributes from the front of the card (C) are used;
   Attributes between the MRZ code and the front of the card attributes are compared;
   One by one of the attribute pairs are matched resulting in an attribute match list; and
   A list of the attribute matches is returned to the client.

This flow defines two outputs that are used in other process flows:
   Scan of the 2D bar code zone from the back of the ID document Scan of the MRZ code Zone from the back of the ID document With respect to the method for Photo ID Matching then an image algorithm matches the numerical representation of all or part of the Photo ID extracted from the Holistic View of the scanned ID document against the numerical representation of all or part of the Photo ID stored in the jurisdiction identity database. A match score may be computed using a distance function. The method may be as follows:

Further image filtering is performed on the image scan of the ID document to get the photo ID from the ID document;

The photo is retrieved from the document ID record in the jurisdiction identity information database and an encrypted photo is returned;

The photo ID from the ID document is compared to the photo from the jurisdiction identity information database information returned. If the confidence level result from the matching algorithm exceeds a specified threshold, then the process proceeds to the next step, otherwise it skips it;

The photo ID from the ID document is considered a match to the photo from the jurisdiction Identity database. An encrypted 'Photo Match' response is returned to the scan location and displayed to the user.

The photo ID from the ID document does not match the photo from the jurisdiction identity database. An encrypted 'Photo Mismatch' response is returned to the scan location and displayed to the user.

This flow defines two outputs that are used in other process flows:

Photo ID image retrieved from the jurisdiction identity database; and

Photo ID on card and jurisdiction identity database match.

With respect to the method for Signature Matching then, for example, an image algorithm matches the numerical representation of all or part of the signature extracted from the Holistic View of the scanned ID document against the numerical representation of all or part of the signature stored in the jurisdiction identity database. A match score is computed using a distance function. A method may be as follows:

Further image filtering is performed on the image scan of the ID document to get the Signature from the ID document;

The signature is retrieved from the document ID record in the jurisdiction identity database and an encrypted photo is returned;

The signature from the ID document is compared to the signature from the jurisdiction identity database. If the confidence level result from the matching algorithm exceeds a specified threshold, then the process proceeds to the next step, otherwise it skips it;

The signature from the ID document is considered a match to the signature from the jurisdiction identity database. An encrypted 'Signature Match' response is returned to the scan location and displayed to the user; and The signature from the ID document does not match the signature from the jurisdiction identity database. An encrypted 'Signature Mismatch' response is returned to the scan location and displayed to the user.

This flow defines two outputs that are used in other process flows:

Signature image retrieved from the jurisdiction identity information database;

Photo ID on card and jurisdiction Identity information database match.

With respect to the method for matching the ID document with the jurisdiction identity server then the server matches numerical representations of a captured scan of an ID document with the numerical representation of a digital representation of the same card as is found in its component parts in a jurisdiction identity database. The method may be as follows:

The attribute match list, the photo ID and signature images from the jurisdiction identity server are used;

The ID document is reconstructed digitally by the server by putting together the card components (ID document issuer's card stock, photo ID, signature, attributes) from the jurisdiction identity database—this is referred to as the "Holistic View." Once the card is matched holistically, a score is computed using a distance function.

The digitally reconstructed ID document is compared to the scan of the ID document. If they are not the same, then the process proceeds to the next step, otherwise it skips it;

Send a 'Card mismatch' response to the client.

Holistic Card Match, the a List of Attributes Matching, Photo ID Match and Signature Match are combined; and The computational algorithm computes the four match scores to compute an overall match of the scanned ID document against the numerical representations of the digital representations of the same photo ID document stored in the jurisdiction identity database.

With respect to a method for increasing the confidence level that the ID document is authentic, images, such as Photo ID, signature, 2D bar code and MRZ code is compared between the ID document and what was originally issued by the issuing authority and is now stored in the Jurisdiction Identity Information Database. However, it is not generally not recommended that the original images be shared outside of the database, which could lead to compromising the integrity of the identity of individuals by copying the image. Instead, it is proposed that a digital representation of each image be stored in the Jurisdiction Identity Information Database. The algorithm for the digital representation is a one-way conversion of the image into a digital code that represents the image uniquely. This algorithm(s) can then be applied to each of the scanned images for the photo ID document as a whole, Photo ID, signature, 2D bar and MRZ code and compared to the stored digital representations of their counterparts.

With respect to the method comparing the Digital Representations. The method may include:

Supplement Jurisdiction Identity Database ID records with digital representations of Photo ID, Signature, 2D bar code, and MRZ code;

Convert the scan of the Photo ID obtained into a digital representation of the image;

Convert the scan of the Signature obtained into a digital representation of the image;

Convert the scan of the 2D bar code obtained into a digital representation of the image;

Convert the scan of the MRZ code obtained into a digital representation of the image;

Compare the digital representations of the scanned Photo ID and the Photo ID from the jurisdiction identity database. A distance measurement, for example, is calculated representing the difference between the two image codes, leading to a confidence level that the images are the same;

Compare the digital representations of the scanned Signature and the Signature from the jurisdiction identity database. A distance measurement, for example, is calculated representing the difference between the two image codes, leading to a confidence level that the images are the same.

Compare the digital representations of the scanned 2D bar code and the 2D bar code from the jurisdiction identity database. A distance measurement, for example, is calculated representing the difference between the two image codes, leading to a confidence level that the images are the same.

Compare the digital representations of the scanned MRZ code and the MRZ code from the jurisdiction identity database. A distance measurement is calculated representing the difference between the two image codes, leading to a confidence level that the images are the same.

The Confidence Levels for the Photo ID, Signature, 2D bar code and MRZ code are combined together to yield an overall measure of authenticity of the ID document; and The Match result response is sent the client.

In some embodiments, a synthesized digital image is used. To get a synthesized image of an identity document a stock document image is obtained and the attribute images (text attributes and photo ID, signature and barcodes) are added to it exactly as they appear on an issued document. We digitally compose the document to match against the scanned image. Synthesizing the document avoids the requirement to manually scan each document as it exists today in real life.

In some embodiments, the ID document comprises unique markings that are created for on issuance of each the individual document. The methods described herein can further comprise matching the markings on the scanned document to the markings on the document stored in the Jurisdiction Identity Information Database.

An example of an embodiment of the invention may be an RT-360 system, located at the retail relying party's place of business, interacts with a Ping360 Validation and Verification Service to validate the photo-ID document and verify the identity of the document bearer. The identity of a photo-ID document bearer was retroactively identity proofed by a registered agent(s) of the government photo-ID issuing authority when the bearer applied for, or renewed, his/her photo ID document (e.g., driver's license). The identity-proofed identity of the bearer is then bound (printed) onto his/her photo-ID document.

The descriptions above have been described to include examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations. Furthermore, to the extent that the term "includes" is used in either the detailed description or the claims; such term is intended to be inclusive in a manner similar to the term "comprising" as "comprising" is interpreted when employed as a transitional word in a claim.

Furthermore, the present technology can take the form of a computer program product comprising program modules accessible from computer-usable or computer-readable medium storing program code for use by or in connection With one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu-Ray™ Both processors and program code for implementing each as aspect of the technology can be centralized or distributed (or a combination thereof) as known to those skilled in the art.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not Included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for validating an identity document comprising:
    scanning the identity document with an imaging device to produce at least one scanned image;
    locating a document identifier (ID) on the identity document using the imaging device;
    determining, using a verification server, whether the document ID is valid with a jurisdiction identity database maintained by an authority who issued the identity document;
    determining with the verification server whether at least one or more predetermined portions of a plurality of portions of the scanned image match a corresponding synthesized digital representation of the identity document as originally issued in the jurisdiction identity information database; and
    outputting to a client device associated with at least one of a user and an enterprise seeking to validate the identity of an individual presenting the identity document an indication of whether or not the identity document is valid based on the determination; wherein
    the one or more predetermined portions of the scanned image of the identity document represent at least one of the scanned image as a whole and parts of the scanned image; and the verification server does not perform any other request to the authority who issued the identity document other than a verification request relating to the document ID for which it receives a record containing data relating to the identity document for verifying the identity document as the verification server is configured such that the verification server does not retrieve original content relating to the identity document from the authority who issued the identity document; wherein scanning the identity document with an image document to produce at least one scanned image comprises:

illuminating the identity document under visible illumination and capturing a first image of the identity document within a predetermined wavelength range within a band selected from a group comprising an ultraviolet band, a visible band and an infrared band;

illuminating the identity document under at least one of ultraviolet illumination and infrared illumination and capturing a second image of the identity document within a predetermined wavelength range within a band selected from the group comprising an ultraviolet band, a visible band and an infrared band; and determining with the verification server whether one or more predetermined portions of the scanned image match a corresponding synthesized digital representation comprises:

determining a first match with a first subset of a plurality of portions of the first image acquired with a first synthesized digital representation of the identity document as originally issued representing an image as would have been imaged under visible illumination;

determining a second match with a first subset of a plurality of portions of the second image acquired with a second synthesized digital representation of the identity document as originally issued representing an image as would have been imaged under at least one of ultraviolet illumination and infrared illumination within the predetermined wavelength range within the band selected from the group comprising an ultraviolet band, a visible band and an infrared band; and determining the match in dependence upon the first match and the second match.

2. The method according to claim 1, wherein
the identity document and the identity document's legitimate bearer were retroactively identity proofed by a registered agent of an authorized identity document issuing authority when the legitimate bearer at least one of applied for, replaced, and renewed the identity document.

3. The method according to claim 1, further comprising;
calculating a feature vector of a complete scan of a front of a card and compare the complete scan to a stored feature vector in the jurisdiction identity information database;
image pre-processing and filtering the front of the identity document to find areas associated with a document type, jurisdiction and Document ID on the identity document;
performing Optical Character Recognition (OCR) on the identity document to decode document type, jurisdiction and Document ID;
checking whether a template database of ID documents containing a physical layout of attributes is based on document type, jurisdiction and year of Introduction to determine whether the Document type and jurisdiction is present;
when the Document type or jurisdiction is not present in the template database, sending an encrypted 'Document Type not found' response to a client device; and
when the Document type or jurisdiction is present in the template database, sending an encrypted query to the jurisdiction identity database for a record corresponding to the document ID.

4. The method according to claim 1, further comprising, if the document ID is found then:
applying Attribute Masks from the template database for the document type to the identity document;
performing optical character recognition on each attribute mask to find an attribute;
producing a list of attributes for the scanned image of the identity document;
comparing the attributes from the identity document to stored attributes for the identity document in the jurisdiction identity database;
providing a list of attribute matches between identity document attributes and the stored attributes.

5. The method according to claim 1, further comprising:
scanning a back of the identity document to create an image scan of the back of a card;
using the template database to find at least one of a bar code and a machine-readable zone (MRZ) code on the scanned back of the identity document;
masking and decoding the at least one of a bar code and the MRZ code to create a list of code attributes;
comparing the code attributes to a list of attributes from the front of the card to produce a code attribute match list;
sending the code attribute match list to a client device associated with at least one of a user and an enterprise seeking to validate the identity of an individual presenting the identity document.

6. The method according to claim 1, further comprising:
illuminating the identity document with a first predetermined wavelength range selected from the group comprising an ultraviolet band, a visible band and an infrared band;
capturing an image of the identity document within a second predetermined wavelength range within a band selected from the group comprising an ultraviolet band, a visible band and an infrared band;
retrieving a feature set relating to the identity document;
applying sequentially a plurality of masks to the captured image and comparing each captured masked image with the feature set to establish a result selected from a group comprising a null, a mismatch and a match and storing the established result for each mask of the plurality of masks;
generating in dependence upon the established results for the plurality of masks a second determination as to whether identified features within the identity document presented for validation scanning match a set of stored features upon the verification server for an identity document issued to an individual whose identity is obtained from processing the captured image of the presented identity document, wherein the set of stored features and identified features of the identity document are not personal characteristics; and
outputting to the display a second indication of whether or not the identity document is valid based on the second determination.

7. The method according to claim 1, further comprising:
performing further image filtering on the image scan of the identity document to obtain a copy of a photo from the identity document;
encrypting the copy of the photo from the identity document;
generating an encrypted photo vector for the image scan of the identity document;
retrieving an encrypted copy of the photo from the document ID record in the jurisdiction identity database;
retrieving an encrypted photo vector from the document ID record in the jurisdiction identity database;
comparing the photo vector from the identity document to the photo vector from the jurisdiction identity database;
comparing the photo from the identity document to the photo from the jurisdiction identity database;
when a photo match confidence level result from a photo matching algorithm exceeds a specified photo match threshold, sending an encrypted 'Photo Match' response to a client device associated with at least one of a user and an enterprise seeking to validate the identity of an individual presenting the identity document; and
when the photo match confidence level result does not exceed the photo match threshold sending an encrypted 'Photo Mismatch' response to the client device.

8. The method according to claim 1 further comprising;
performing further image filtering on the Image scan of the identity document to obtain a copy of the signature from the identity document;
retrieving an encrypted signature from the document ID record in the jurisdiction identity database;
comparing the signature from the identity document to the signature from the jurisdiction identity database;
retrieving an encrypted signature vector from the document ID record in the jurisdiction identity database;
comparing the signature vector from the identity document to the signature vector from the jurisdiction identity database;
when a signature match confidence level result from a signature matching algorithm exceeds a specified signature match threshold, sending an encrypted 'Signature Match' response to a client device associated with at least one of a user and an enterprise seeking to validate the identity of an individual presenting the identity document; and
when the signature match confidence level result does not exceed the signature match threshold, sending an encrypted 'Photo Mismatch' response to the client device.

9. The method according to claim 1 further comprising;
computing a matching score from all of the attribute matching using a distance function.

10. The method according to claim 1, wherein
the parts comprise at least one of a photo ID, a signature, and a barcodes.

11. A system for validating an identity document, the system comprising:
a terminal for scanning the identity document;
an identity verification server for determining whether the identity document is valid by executing software executable instructions relating to a process comprising the steps of:
scanning the identity document with an imaging device to produce at least one scanned image;
locating a document identifier (ID) on the identity document using the imaging device;
locating, using a verification server, an identity number in a jurisdiction identity database maintained by an authority who issued the identity document;
determining with the verification server whether at least one or more predetermined portions of a plurality of portions of the scanned image match a corresponding synthesized digital representation of the identity document as originally issued in the jurisdiction identity information database; and
outputting to a client device associated with at least one of a user and an enterprise seeking to validate the identity of an individual presenting the identity document an indication of whether or not the identity document is valid based on the determination; wherein
the one or more predetermined portions of the scanned image of the identity document represent at least one of the scanned image as a whole and parts of the scanned image; and
the verification server does not perform any other request for the authority who issued the identity document other than a verification request relating to the document ID for which the verification server receives a record containing data relating to the identity document for verifying the identity document as the verification server is configured such that the verification server does not retrieve original content relating to the identity document from the authority who issued the identity document; wherein
scanning the identity document with an image document to produce at least one scanned image comprises:
illuminating the identity document under visible illumination and capturing a first image of the identity document within a predetermined wavelength range within a band selected from a group comprising an ultraviolet band, a visible band and an infrared band;
illuminating the identity document under at least one of ultraviolet illumination and infrared illumination and capturing a second image of the identity document within a predetermined wavelength range within a band selected from the group comprising an ultraviolet band, a visible band and an infrared band; and
determining with the verification server whether one or more predetermined portions of the scanned image match a corresponding synthesized digital representation comprises:
determining a first match with a first subset of a plurality of portions of the first image acquired with a first synthesized digital representation of the identity document as originally issued representing an image as would have been imaged under visible illumination;
determining a second match with a first subset of a plurality of portions of the second image acquired with a second synthesized digital representation of the identity document as originally issued representing an image as would have been imaged under at least one of ultraviolet illumination and infrared illumination within the
predetermined wavelength range within the band selected from the group comprising an ultraviolet band, a visible band and an infrared band; and
determining the match in dependence upon the first match and the second match.

12. The system according to claim 11, wherein
the identity document and the identity document's legitimate bearer were retroactively identity proofed by a registered agent of an authorized identity document issuing authority when the legitimate bearer at least one of applied for, replaced, and renewed the identity document.

13. The system according to claim 11, wherein
the software executable instructions relating to the process further comprise the steps of:
calculating a feature vector of a complete scan of the front of a card and compare the complete scan to a stored feature vector in the jurisdiction identity information database;
image pre-processing and filtering the front of the identity document to find areas associated with a document type, jurisdiction and Document ID on the identity document;
performing Optical Character Recognition (OCR) on the identity document to decode document type, jurisdiction and Document ID;
checking whether a template database of ID documents containing a physical layout of attributes is based on document type, jurisdiction and year of introduction to determine whether the Document type and jurisdiction is present;
when the Document type or jurisdiction is not present in the template database, sending an encrypted 'Document Type not found' response to a client device; and
when the Document type or jurisdiction is present in the template database, sending an encrypted query the jurisdiction identity database for a record corresponding to the document ID.

14. The system according to claim 11, wherein:
the identity verification server when the document ID is found then it executes additional software executable instructions relating to the process comprising the steps of:
applying Attribute Masks from the template database for the document type to the identity document;
performing optical character recognition on each attribute mask to find an attribute;
producing a list of attributes for the scanned image of the identity document;
comparing the attributes from the identity document to stored attributes for the identity document in the jurisdiction identity database;
providing a list of attribute matches between identity document attributes and the stored attributes.

15. The system according to claim 11, wherein
the software executable instructions relating to the process further comprise the steps of:
scanning a back of the identity document to create an image scan of the back of a card;
using the template database to find at least one of a bar code and a machine-readable zone (MRZ) code on the scanned back of the identity document;
masking and decoding the at least one of a bar code and the MRZ code to create a list of code attributes;
comparing the code attributes to a list of attributes from the front of the card to produce a code attribute match list;
sending the code attribute match list to a client device associated with at least one of a user and an enterprise seeking to validate the identity of an individual presenting the identity document.

16. The system according to claim 11, wherein
the software executable instructions relating to the process further comprise the steps of:
illuminating the identity document with a first predetermined wavelength range selected from the group comprising an ultraviolet band, a visible band and an infrared band;
capturing an image of the identity document within a second predetermined wavelength range within a band selected from the group comprising an ultraviolet band, a visible band and an infrared band;
retrieving a feature set relating to the identity document;
applying sequentially a plurality of masks to the captured image and comparing each captured masked image with the feature set to establish a result selected from a group comprising a null, a mismatch and a match and storing the established result for each mask of the plurality of masks;
generating in dependence upon the established results for the plurality of masks a second determination as to whether identified features within the identity document presented for validation scanning match a set of stored features upon the verification server for an identity document issued to an individual whose identity is obtained from processing the captured images of the presented identity document, wherein the set of stored features and identified features of the identity document are not personal characteristics; and
outputting to the display a second indication of whether or not the identity document is valid based on the second determination.

17. The system according to claim 11, wherein
the software executable instructions relating to the process further comprise the steps of either:
performing further image filtering on the image scan of the identity document to obtain a copy of a photo from the identity document;
encrypting the copy of the photo from the identity document;
generating an encrypted photo vector for the image scan of the identity document;
retrieving an encrypted copy of the photo from the document ID record in the jurisdiction identity database;
retrieving an encrypted photo vector from the document ID record in the jurisdiction identity database;
comparing the photo vector from the identity document to the photo vector from the jurisdiction identity database;
comparing the photo from the identity document to the photo from the jurisdiction identity database;
when a photo match confidence level result from a photo matching algorithm exceeds a specified photo match threshold, sending an encrypted 'Photo Match' response to a client device associated with at least one of a user and an enterprise seeking to validate the identity of an individual presenting the identity document; and
when the photo match confidence level result does not exceed the photo match threshold sending an encrypted 'Photo Mismatch' response to the client device;

and
- performing further image filtering on the Image scan of the identity document to obtain a copy of the signature from the identity document;
- retrieving an encrypted signature from the document ID record in the jurisdiction identity database;
- comparing the signature from the identity document to the signature from the jurisdiction identity database;
- retrieving an encrypted signature vector from the document ID record in the jurisdiction identity database;
- comparing the signature vector from the identity document to the signature vector from the jurisdiction identity database;
- when a signature match confidence level result from a signature matching algorithm exceeds a specified signature match threshold, sending an encrypted 'Signature Match' response to a client device associated with at least one of a user and an enterprise seeking to validate the identity of an individual presenting the identity document; and
- when the signature match confidence level result does not exceed the signature match threshold, sending an encrypted 'Photo Mismatch' response to the client device.

18. The system according to claim 11, wherein at least one of the identity verification server computes a matching score from all of the attribute matching using a distance function; and the parts comprise at least one of a photo ID, a signature, and a barcodes.

\* \* \* \* \*